United States Patent [19]
Davidian

[11] Patent Number: 5,357,438
[45] Date of Patent: Oct. 18, 1994

[54] ANTI-COLLISION SYSTEM FOR VEHICLES

[76] Inventor: Dan Davidian, 16 Mania Shochat, Holon, Israel

[21] Appl. No.: 70,817

[22] Filed: Jun. 3, 1993

[30] Foreign Application Priority Data

Jun. 4, 1992 [IL]  Israel ................................... 102097

[51] Int. Cl.⁵ .......................................... G06F 15/50
[52] U.S. Cl. .............................. 364/461; 364/426.04; 342/455; 340/436; 180/169
[58] Field of Search .................... 364/460, 461, 424.01, 364/424.04, 426.04; 340/435, 436, 437, 438, 961; 342/29, 41, 455; 434/236, 238, 258; 273/440; 180/167–169; 73/517 A

[56] References Cited

U.S. PATENT DOCUMENTS

| | | | |
|---|---|---|---|
| 3,737,902 | 6/1973 | O'Hagan et al. | 342/41 |
| 3,918,176 | 11/1975 | Abernethy, III et al. | 424/258 |
| 4,621,705 | 11/1986 | Etoh | 364/461 |
| 4,638,289 | 1/1987 | Zottnik | 73/517 A |
| 4,770,636 | 9/1988 | Buschke | 436/236 |
| 5,014,200 | 5/1991 | Chundrlik et al. | 364/426.04 |
| 5,166,881 | 11/1992 | Akasu | 364/461 |

*Primary Examiner*—Gary Chin
*Attorney, Agent, or Firm*—Benjamin J. Barish

[57] ABSTRACT

An anti-collision system for vehicles includes a speed sensor for sensing the speed of the vehicle, a space sensor for measuring the distance of the vehicle from an object, a computer for computing a danger-of-collision distance to the object, an alarm actuated by the computer when the sensed distance of the object is equal to or less than the danger-of-collision distance compared by the computer, and a brake light actuated upon the actuation of said alarm. The system also includes a control panel having parameter presetting means for presetting preselected parameters concerning the vehicle, the vehicle driver, and the environment, which are utilized by the computer for computing the danger-of-collision distance to the object.

20 Claims, 30 Drawing Sheets

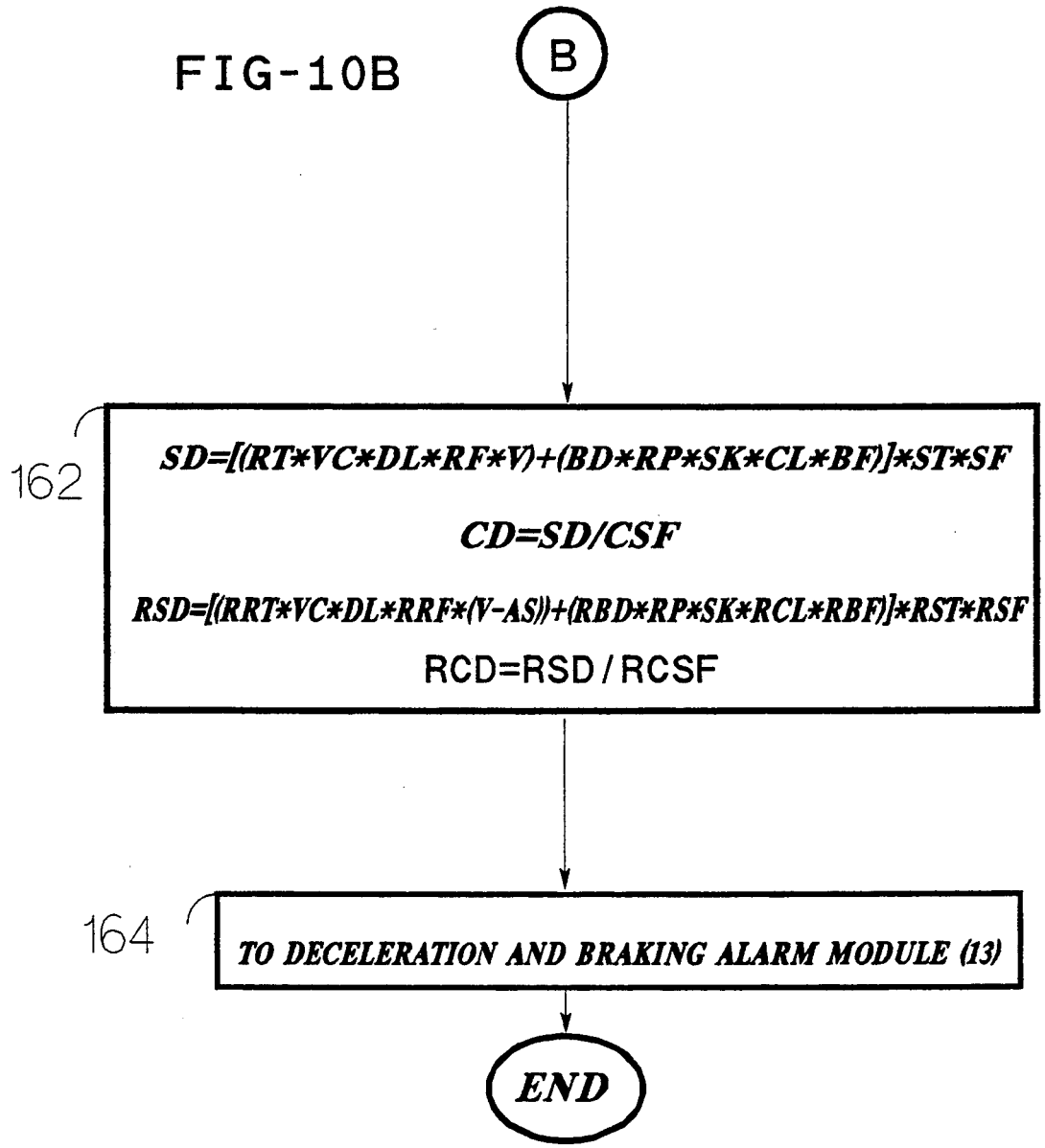

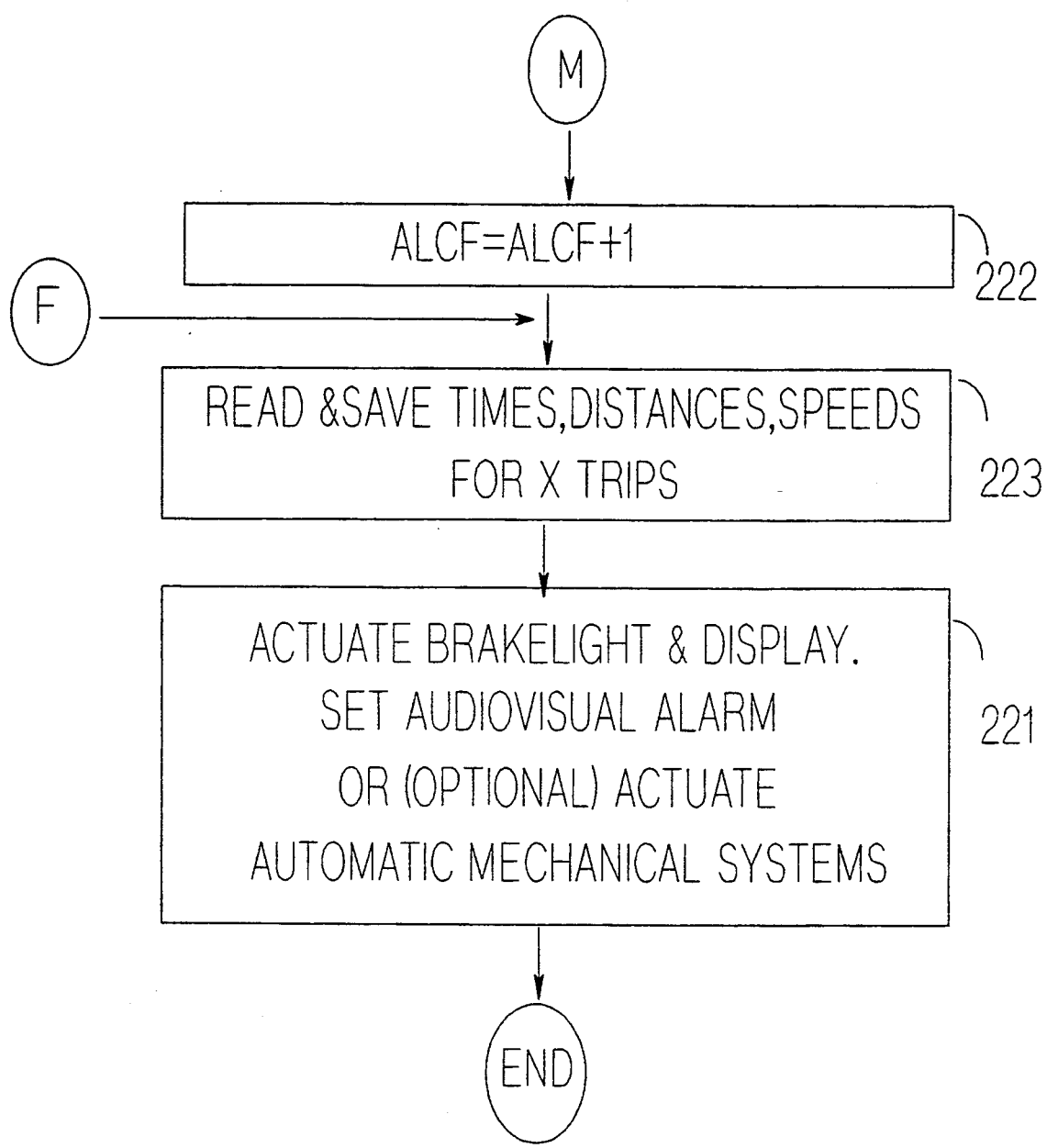

ANTI-COLLISION SYSTEM FOR VEHICLES

FIELD AND BACKGROUND OF THE INVENTION

The present invention relates to an anti-collision system for vehicles. The invention is especially useful for passenger cars, taxis, trucks and buses, and is therefore described below particularly with respect to such vehicles, but the invention, or some aspects of the invention, could also advantageously be used for other types of vehicles, e.g., trains and aircraft.

One of the most frequent causes of vehicle accidents is the failure of a vehicle to maintain an assured safe distance behind another vehicle to prevent a rear end collision should the front vehicle suddenly stop. The assured safe distance required to prevent such a rear-end collision depends on the reaction time of the vehicle driver before the brake pedal is actually depressed, and the braking distance traversed by the vehicle before it comes to a complete stop after the braking pedal has been depressed. Both of these factors vary according to the surrounding circumstances at the time of driving.

In order to prevent collisions, many parameters, which are constantly changing during the year or even during a trip, may affect the stopping distance of the vehicle and therefore should be taken into account. These parameters include: the condition of the driver, such as the driver's reaction time; the condition of the vehicle, such as the vehicle load, the tires pressure; and environmental conditions, such as road type, visibility, skidding condition.

It is very important that the computer determines the danger-of-collision distance according to the specific conditions existing at the time the vehicle is being operated. Thus, if the determined danger-of-collision distance is too high for the specific operating conditions, there will be a high rate of "false alarms"; this will reduce the credibility of the system to the driver, which can result in a true collision condition being ignored. On the other hand, if the determined danger-of-collision distance is too low for the specific operating conditions, this could result in failure to actuate the alarm in time when there was truly a collision condition.

Many anti-collision systems have been proposed, but insofar as I am aware, none has yet gained any widespread use, probably because the proposed systems have not taken into consideration the variable nature of the many parameters which influence the reaction time and/or the braking distance involved at any particular time for determining the assured safe distance required to be maintained.

An object of the present invention is to provide an anti-collision system which is more closely responsive to the actual driving conditions for actuating an alarm.

BRIEF SUMMARY OF THE INVENTION

According to the present invention, there is provided an anti-collision system for vehicles, comprising: means for determining the speed of the vehicle; means for measuring the distance of the vehicle from an object; a computer for receiving a number of parameters, including the speed of the vehicle, and for computing from the parameters a danger-of-collision distance to the object; and a Collision alarm actuated by the computer when the measured distance of the object is equal to or less than the danger-of-collision distance computed by the computer; characterized in that the system also includes a control panel having parameter presetting means for presetting preselected parameters which are utilized by the computer for computing the danger-of-collision distance to the object.

According to further features in the preferred embodiment of the invention described below, the system also includes a Safety alarm actuated by the computer, before actuating the Collision alarm, when the measured distance is equal to or less than the danger-of-collision distance multiplied by a predetermined safety factor.

According to further features in the described preferred embodiment, below, the control panel also includes distance presetting means for presetting a selected fixed distance from an object, the computer being effective to actuate the Collision alarm also when the sensed distance to the object is equal to or less than the fixed distance.

According to still further features in the described preferred embodiment, the preselected parameters include: at least one vehicle parameter concerning a preselected condition of the vehicle; at least one driver parameter concerning a preselected condition of the vehicle driver; and at least one environmental parameter concerning a preselected condition of the environment. In the described preferred embodiment, the presetting is effected by a plurality of depressible keys on the control panel.

The system described below also includes a plurality of condition sensors for sensing any one of a plurality of selected conditions, and for automatically feeding to the computer information with respect to the sensed conditions, which information is also utilized by the computer for computing the danger-of-collision distance to the object. One of the described condition sensors includes a condition-of-driver sensor comprising a plurality of depressible keys, means for displaying a random sequence in which the latter keys are to be depressed, and means for comparing the actual sequence in which the keys are depressed with the displayed random sequence to provide a condition-of-driver parameter, which parameter is also utilized by the computer for enabling or disabling vehicle operation and/or for computing the danger-of-collision distance to the object.

According to another feature in the described preferred embodiment, the system further includes a sealed recording device which records all incidents in which the computer actuates the alarms.

As will be described more particularly below, an anti-collision system constructed in accordance with some or all of the foregoing features enables the system to be more closely responsive to the actual conditions at the time of driving the vehicle, including the condition of the vehicle, the driver, and the environment, in determining the danger-of-collision distance to avoid a rear-end collision. Such a system is useful not only for passenger vehicles, but also for other types of vehicles, such as trucks and buses. The condition-of-driver sensor referred to above, and also the sealed recording device, are particularly useful in buses, trucks, trains and aircraft, to test the condition of the driver, to assure that the driver is in proper condition for driving the vehicle, and/or to maintain a record which can be later checked as to all incidents in which an alarm was actuated by the computer.

According to a further feature, the system includes an actuator for actuating a mechanical system of the vehicle, e.g., the brakes of a train, or steering of an aircraft, at the time the collision alarm is actuated.

Further features and advantages of the invention will be apparent from the description below.

BRIEF DESCRIPTION OF THE DRAWINGS

The invention is herein described, by way of example only, with reference to the accompanying drawings, wherein:

FIGS. 10A-10B, together, constitute flow charts illustrating the overall operation of the Calculation module in the microcomputer of FIGS. 6A and 6B;

FIG. 11A-11H, together, constitute flow charts illustrating the operation of the deceleration alarm module in the microcomputer of FIGS. 6A and 6B;

DESCRIPTION OF PREFERRED EMBODIMENTS

Overall System

The anti-collision system illustrated in FIGS. 1-14 is particularly useful for motor vehicles (passengers cars, buses, trucks) in order to actuate an alarm when the vehicle is travelling at a distance behind another vehicle or in front of another, which is equal to or less than a danger-of-collision distance computed by a computer such that if the front vehicle stops suddenly there is a danger of a rear-end collision. For this purpose, the system includes means for continuously determining the speed of the vehicle; means for measuring the distance and computing the relative speed between it and the other vehicle or object; presettable means for presetting various conditions of the vehicle, vehicle driver and/or environment; and sensors for automatically sensing other conditions. All of these are taken into consideration by the computer for determining the danger-of-collision distance. By thus taking into consideration all the foregoing parameters, which may vary widely under varying driving conditions, the system is more closely responsive to the actual conditions existing at the time the vehicle is operated, and therefore provides a more creditable alarm.

In the system described below, there are two alarms: a Collision alarm, which is actuated when the vehicle is determined to be within the danger-of-collision distance; and a Safety alarm, which is actuated before the Collision alarm, at a distance greater than the danger-of-collision distance by a predetermined safety factor, e.g., 1.25. For example, if the danger-of-collision distance is determined to be 100 feet for particular driving conditions, the Safety alarm will be actuated when the vehicle is within 125 feet, and if this distance continues to decrease, the Collision alarm will be actuated when the vehicle reaches 100 feet from the object. The Safety alarm alerts the driver and is preferably both an interrupted beep and a continuous visual indicator on the panel; whereas the Collision alarm is preferably a continuous, higher-intensity beep and a flashing visual indicator on the control panel.

The control panel also includes a distance presetting means for presetting a selected fixed distance from an object, so that when a constant distance alarm is made effective the driver can maintain a fixed distance behind another vehicle if he so desires. The computer is effective to actuate one of the alarms, e.g., the Safety alarm, when the distance to the object is equal to or less than the fixed distance.

Automatic sensors

Figure 1:
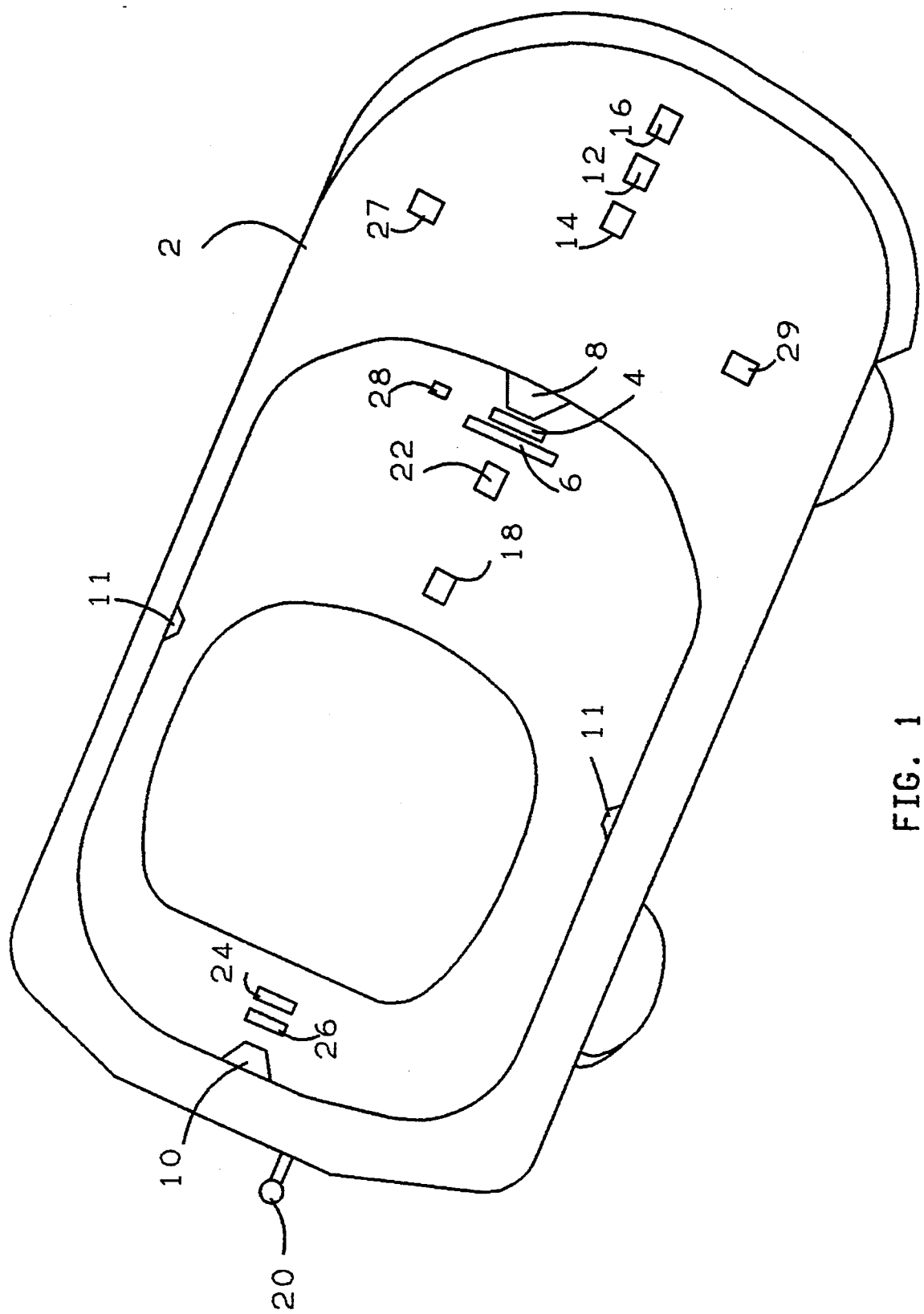
FIG. 1 diagrammatically illustrates one form of vehicle equipped with an anti-collision system in accordance with the present invention.

FIG. 1 diagrammatically illustrates, for purposes of example, a plurality of automatic sensors and other electrical devices included in a vehicle equipped with an anti-collision system constructed in accordance with the present invention.

Figure 2:
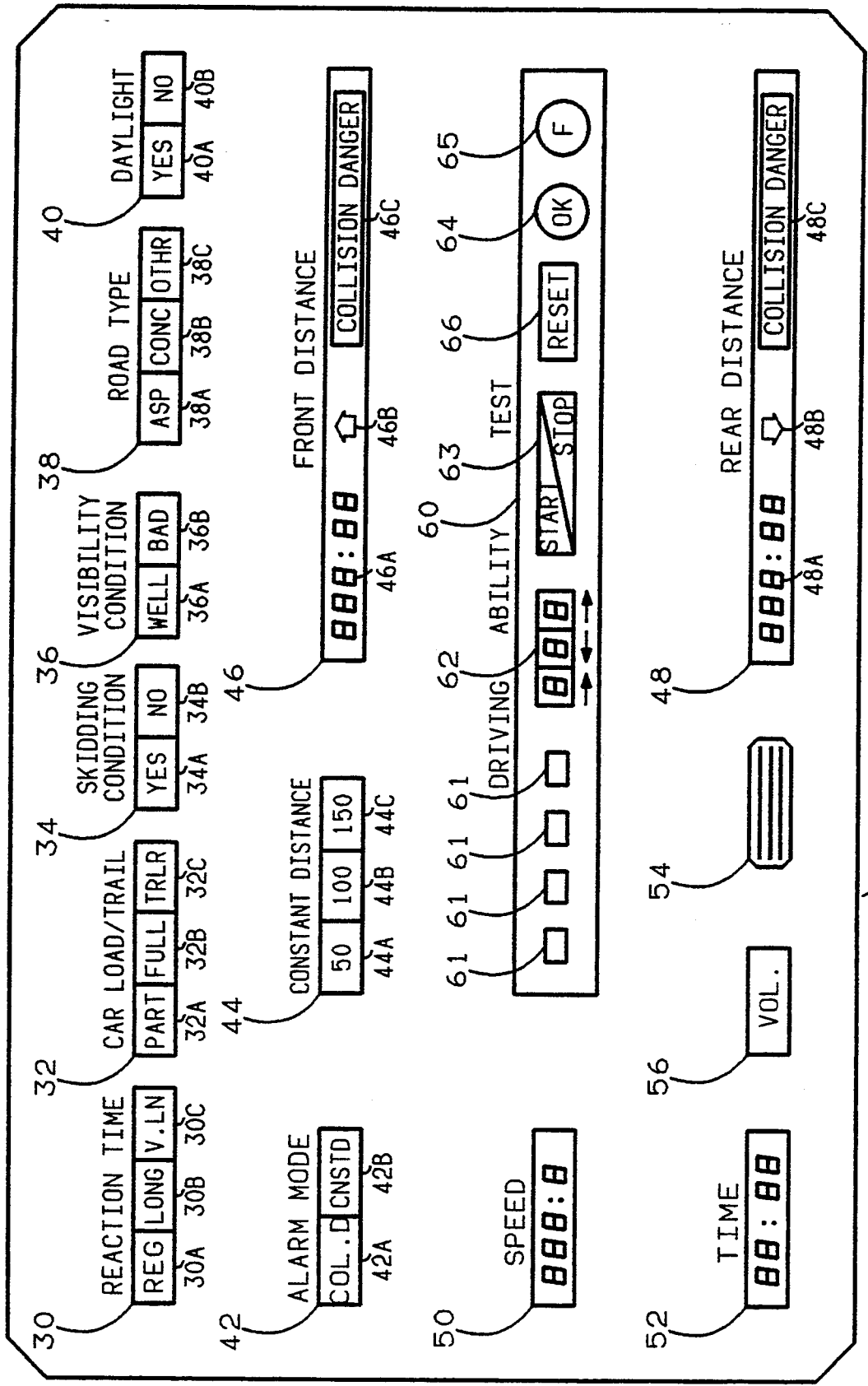
FIG. 2 illustrates an example of the system control panel to be mounted in the driver's compartment to enable presetting various parameters and also to display various information.
Figure 3:
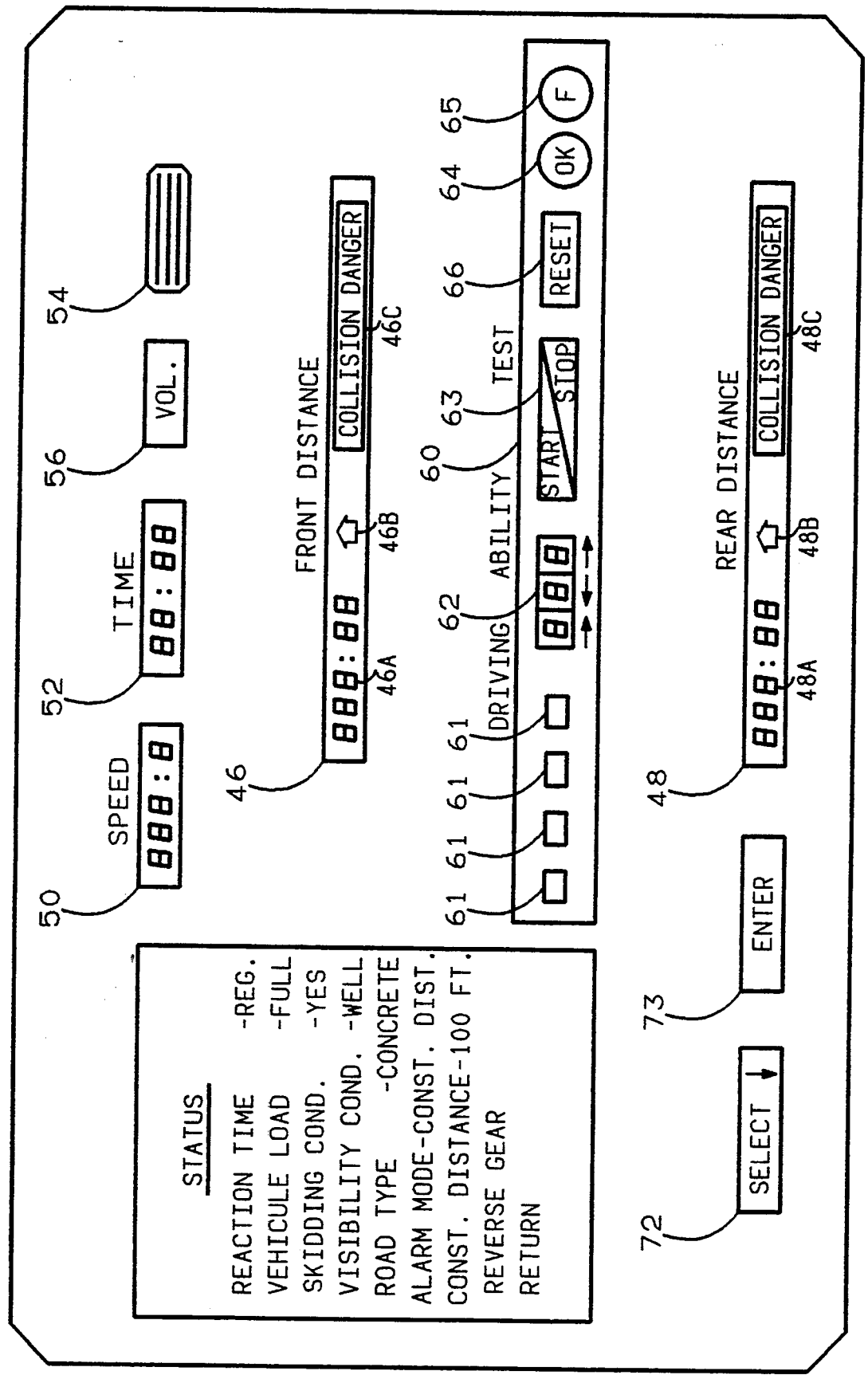
FIG. 3 illustrates another type of control panel that may be used in the anti-collision system.

Thus, the vehicle, generally designated 2, is equipped with a microcomputer 4 having a control panel 6 installed in the passenger compartment of the vehicle at a location conveniently accessible to the driver. FIGS. 2 and 3, to be described below, illustrate two types of control panels that may be used for this purpose.

Vehicle 2 further includes a front space sensor 8 for sensing the space in front of the vehicle, such as the presence of another vehicle, a corresponding rear space sensor 10, and a pair of side sensors 11. All the space sensors are in the form of pulse (e.g., ultrasonic) transmitters and receivers, for determining the distance of the vehicle from an object, e.g., another vehicle, at front or rear. Space sensors may also be provided at the sides of the vehicle. Vehicle 2 is further equipped with a speed sensor 12 which may sense the speed of the vehicle in any known manner, for example using the speed measuring system of the vehicle itself, or a speed measuring system independent of the vehicle, e.g., an acceleration sensor, or by calculations based on the Doppler effect, etc.

The automatic sensors on vehicle 2 further include a daylight sensor 14, a rain sensor 16, a vehicle load sensor 18, a trailer-hitch sensor 20, and a reverse-gear sensor 22.

In addition to the foregoing sensors, the vehicle 2 illustrated in FIG. 1 includes a brake light 24 at the rear of the vehicle controlled by a brake light actuator 26. It also includes a start-up enable device 27 for starting the engine of the vehicle.

The illustrated vehicle further includes a black box shown at 28. In this black box are reported every incident in which an alarm condition was experienced by the vehicle, including pertinent parameters with respect to the incident, particularly time, speed of the vehicle, and the distance from the object when the alarm was triggered. This information may be periodically read out of the black box and is particularly useful with respect to taxicabs, trucks, buses, trains, vehicles transporting dangerous cargo (e.g., explosives), ambulances, fire department vehicles, etc.

Further, the vehicle includes an automatic actuator 29, e.g. for actuating the brakes in case of a train, or the steering in case of an aircraft.

Control Panel

FIG. 2 illustrates one form of control panel 6 for presetting various parameters into the system, for displaying the status of the presettable parameters, and for providing the alarms. The parameters are preset by depressing selected keys in the control panel, each key being illuminated by a light source when it is depressed to indicate its depressed condition. Control panel 6 illustrated in FIG. 2 also includes a number of displays, and also a driving ability testing device which will be described more particularly below.

With respect to the presettable parameters, control panel 6 illustrated in FIG. 2 includes a group of keys 30 for presetting the Reaction Time of the driver. Thus, key 30a would be depressed to indicate a regular reaction time, key 30b would be depressed to indicate a long reaction time, and key 30c would be depressed to indicate a very long reaction time. The reaction time would be influenced primarily by the age of the driver, but could also be influenced by other factors, e.g., the alertness condition of the driver, etc.

Control panel 6 includes another group of presettable keys 32 to indicate the load condition of the vehicle. Thus, depressing key 32a indicates a partial load, key 32b indicates a full load, and key 32c indicates a trailer is hitched to the vehicle. The foregoing presettable parameters concerning the load condition of the vehicle may be used in the absence of the sensors 18 and 20 for automatically sensing the load of the vehicle and the hitching of a trailer, respectively, as described earlier with respect to FIG. 1.

Control panel 6 includes two keys 34 indicating the condition of the road with respect to the danger of skidding thereon by the vehicle. Thus, key 34a would be depressed to indicate a slippery condition of the road and therefore a high danger of skidding, whereas key 34b would be depressed to indicate an unslippery condition of the road (e.g., dry) and therefore a low danger of skidding.

Two keys 36 on the control panel 6 indicate the visibility condition of the road. Thus, key 36a would be depressed where the visibility condition is high, whereas key 36b would be depressed where it is low, e.g., because of fog, sandstorm, snow, etc.

Three keys 38 indicate the type of road over which the vehicle is travelling. Thus, the depression of key 38a indicates an asphalt road, key 38b a concrete road, and 38c a dirt or gravel road.

Keys 40 indicate the daylight condition while driving. Thus, if it is daytime key 40a would be depressed, and if it is nighttime key 40b would be depressed.

The control panel 6 includes two keys 42 to select the mode of operation of the system. Thus, key 42a selects the Collision Danger mode of operation, wherein the alarm would be actuated whenever a collision danger is present as will be described below. However, at times the driver would like to know whether or not his vehicle is within a predetermined fixed distance behind another vehicle. In such case, the fixed distance would be selected by keys 44, and key 42b would be depressed to select the Constant Distance mode, whereupon the system would actuate an alarm whenever the sensed distance is equal to or less than the selected constant distance. In the example illustrated in FIG. 2, keys 44 enable the selection of any one of three distances, namely 50, 100 and 150 meters, by keys 44a, 44b and 44c, respectively. It will be appreciated, however, that other parameters and distances, and other means of selecting such parameters and distances, could be provided in the control panel 4.

Control panel 6 further includes a front distance display 46, in which are displayed the distance to the front vehicle (in region 46a), in which direction (by arrow 46b), and whether or not there is a collision danger (region 46c). A similar display, shown at 48 and having regions 48a, 48b and 48c, is provided with respect to the rear of the vehicle equipped with the system, whether a rear collision danger exists, and the status of the rear brake light.

The actual speed of the vehicle is shown in the speed display 50. As indicated earlier, this speed may be taken from the conventional speed measuring system of the vehicle, or may be independently measured or calculated using the front space sensor, e.g., by the Doppler effect. Control panel 6 further includes a real time clock having a time display 52.

Control panel 6 further includes a speaker 54 for producing an audio alarm in the event of a collision danger, in addition to the visually-indicated alarms of sections 46c and 48c of the displays 46 and 48. A key 56 on the control panel enables presetting the volume of the audible alarm.

Control panel 4 further includes a driving ability test device, generally designated 60, which enables the alertness condition of the driver to be tested. This device includes a line of depressible keys 61 and a display 62 controlled by the microcomputer 4 for randomly displaying sequences in which keys 61 are-to be depressed. In the example illustrated in FIG. 4, display 62 indicates that keys 61 are to be depressed in a forward sequence (left to right) eight times, then depressed in the reverse sequence (right to left) another eight times, and then to be depressed in the forward sequence a further eight times. When the driving ability test is to be conducted, a Start/Stop key 63 is depressed whereupon a timer is started. When the driver completes the test, he again depresses key 63. The time is measured between the two depressions of key 63 thereby providing an indication of the time required by the driver to depress the keys according to the required sequences.

This time is a measure of the "alertness" of the driver. It may thereby be used to provide a parameter of the driver condition and inputted into the microcomputer 4. In the illustrated system, however, depressing the displayed sequences of the keys in the right order within a predetermined time period is a condition required to be met before the vehicle can be started, as will be described more particularly below with respect to the flow chart of FIG. 14. Failure to meet the condition is indicated by display 65, and passing the condition is indicated by display 64. If one attempt fails, another attempt may be made by depressing Reset key 66. Such a driving ability test device is particularly useful with respect to trucks, buses, vehicles carrying dangerous cargoes, aircraft, and trains, to make sure that the driver is fit to operate the vehicle before enabling the vehicle for operation.

FIG. 3 illustrates an alternative type of control panel, therein designated 70, which may be used instead of the control panel 6 illustrated in FIG. 2. Control panel 70 is of the "menu" type, in which a menu display 71 displays the various categories of information or options that may be selected or preset into the computer or displayed in the control panel. The menu display 71 is controlled by a Select key 72 which advances the display each time the key is depressed (or continuously until the key is permitted to return), and an Enter key 73 which enters the selection shown in the display 71 at the time that key is depressed. In this panel, the status of the driving conditions is displayed whenever selections or other displays are not made or shown.

Figure 4:
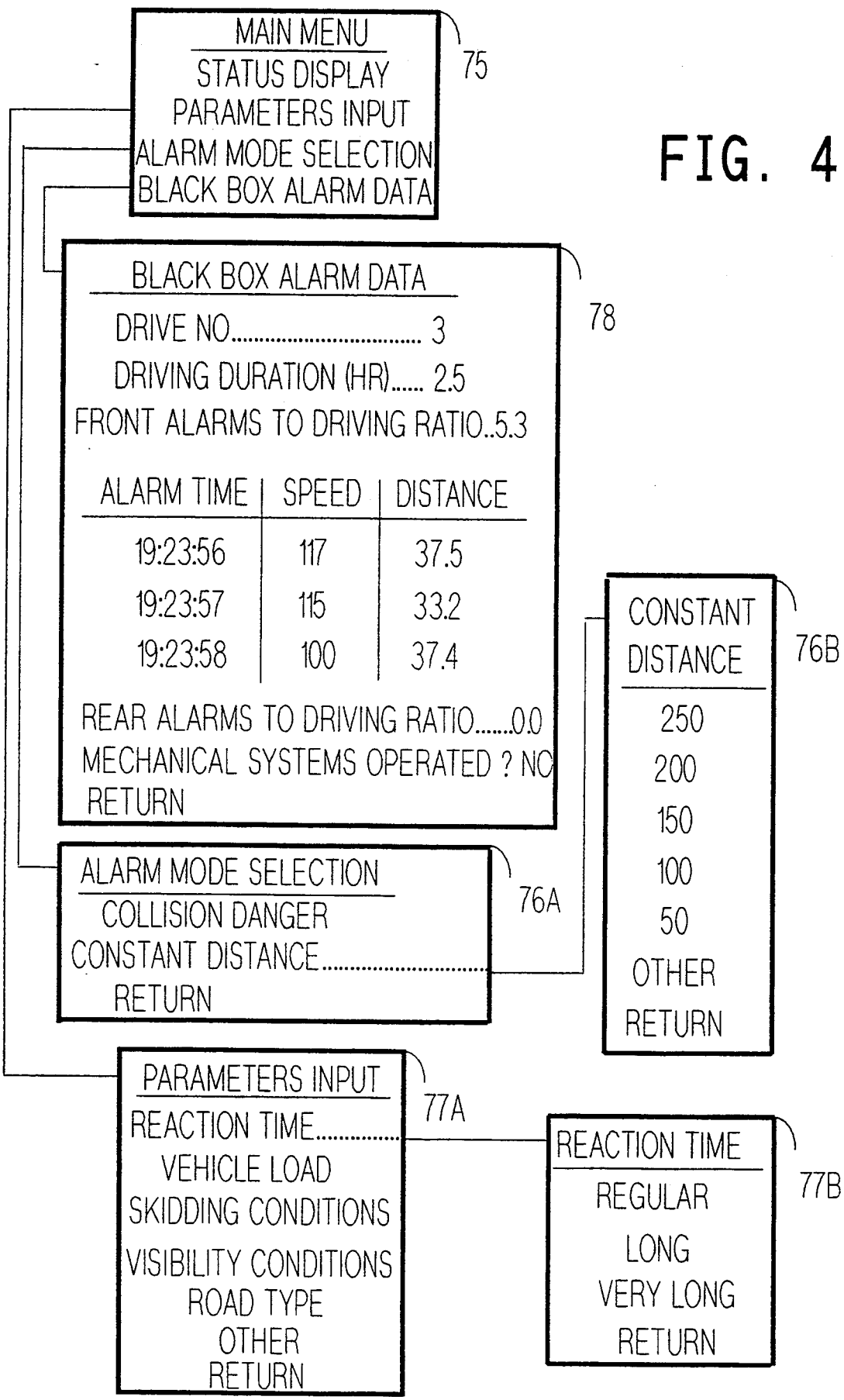
FIG. 4 illustrates examples of menu-type displays which may be included in the control panel of FIG. 3.

FIG. 4 illustrates the examples of various types of menus which may be shown in the menu display 71. Thus, one display is the Main Menu as shown at 75, which lists the various modes of display that may be selected, namely the following: a Status display, as shown at 71 in FIG. 3; an Alarm Mode Selection display, as shown at 76a (FIG. 4), which enables the selection of the desired Alarm mode, namely Collision Danger, or Constant Distance; and if Constant Distance is selected, display 76b enables the selection of the distance; a Parameters Input mode 77a, which enables selection of the parameters input, each category of which includes a further display and enables the selection of one item within the respective category, as shown by the Reaction Time display 77b; and a Black Box alarm display 78, which displays the printed data stored within the black box 28.

By thus utilizing a menu display as shown in FIGS. 3 and 4, it will be appreciated that a large number of operational modes may be provided, a large number of parameters may be preset with each parameter divided into a large number of classifications, and a large number of displays may be made, in a relatively compact control panel, as compared to the control panel 6 illustrated in FIG. 2.

The control panel 70 illustrated in FIG. 3 includes the other displays and devices shown in FIG. 2, and therefore have been identified by the same reference numbers to facilitate understanding.

Figure 5:
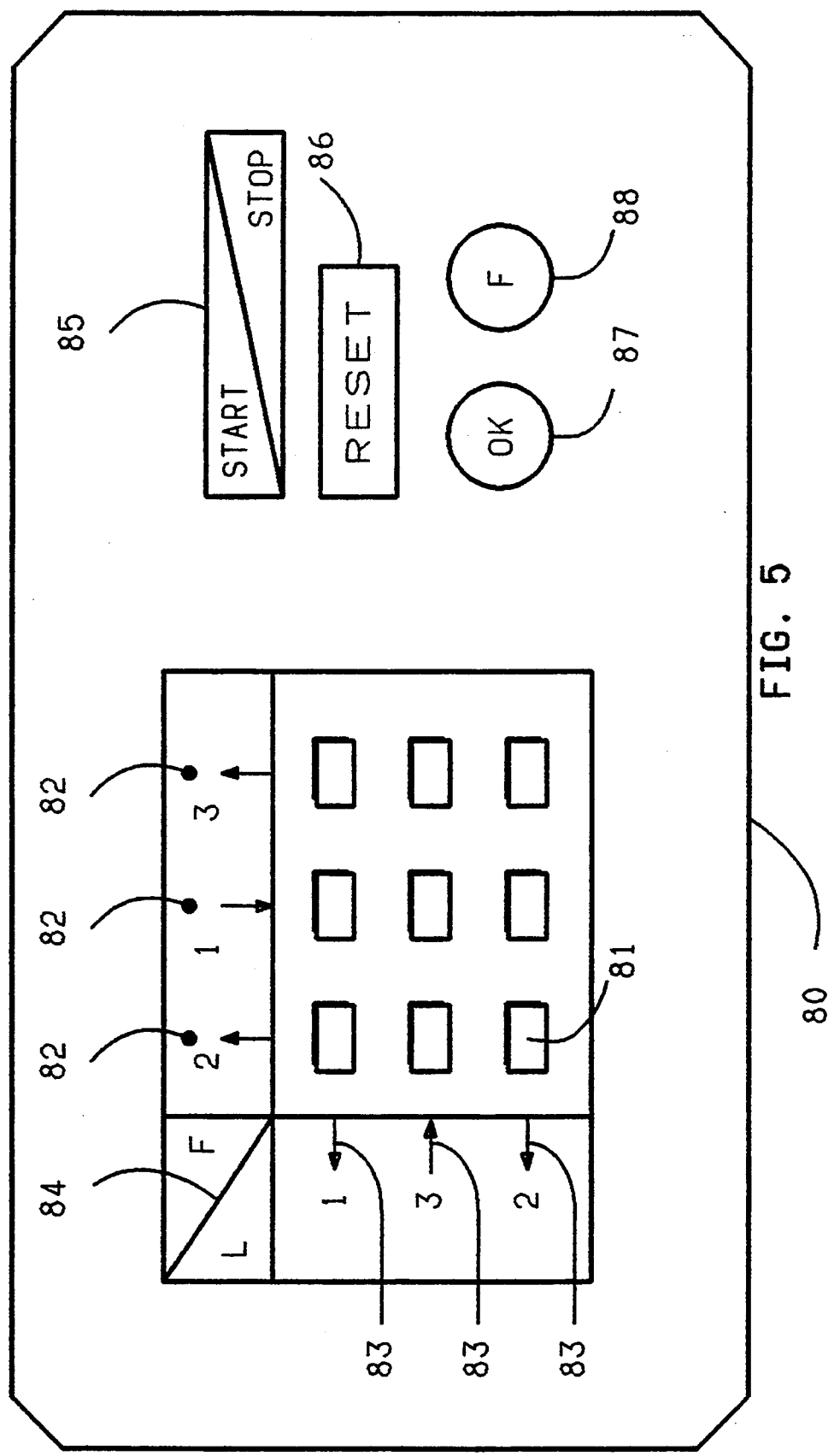
FIG. 5 illustrates a driving ability test device used as a condition-of-driver sensor for sensing the condition of the driver and/or for enabling or disabling operation of the vehicle.

FIG. 5 illustrates a more complicated driving ability test device that may be included in the control panel, or in a separate control panel.

Thus, the driving ability testing device 80 illustrated in FIG. 5 includes, instead of a single line of keys (keys 61 in FIGS. 2 and 3), a matrix of keys 81 arranged in a plurality of horizontal rows and vertical columns. Device 80 further includes a horizontal display 82 and a vertical display 83. The horizontal display 82 displays, for each vertical column, the random sequences and directions in which the keys are to be depressed and the random number of times such keys are to be sequentially depressed. The vertical display 83 also displays the random sequence, and a number of times, the keys in each of the three horizontal rows are to be depressed. A further display 84 indicates whether the sequencing of the vertical columns or the horizontal rows is to be effected first (F) or last (L).

Thus, in the example illustrated in FIG. 5, display 84 indicates that the random display 82a is to be first executed, and then the random display 83 is to be executed. Random display 82 indicates that the first vertical column of keys are to be depressed consecutively in two sequences starting from the bottom, the middle column of keys are to be depressed in one sequence, starting from the top; and the rightmost column of keys are to be depressed consecutively in three sequences starting from the bottom. Display 83 indicates that the first horizontal line of keys are to be depressed once from right to left, the second horizontal line of keys are to be depressed three times, from left to right, and the third horizontal line of keys are to be depressed twice, from right to left.

The driving ability testing device 80 illustrated in FIG. 5 includes the other keys of device 60 shown in FIG. 2, namely keys 85, 86, 87 and 88, corresponding to keys 63, 64, 65 and 66, respectively, in the device of FIG. 2.

The Microcomputer

Figure 6A:
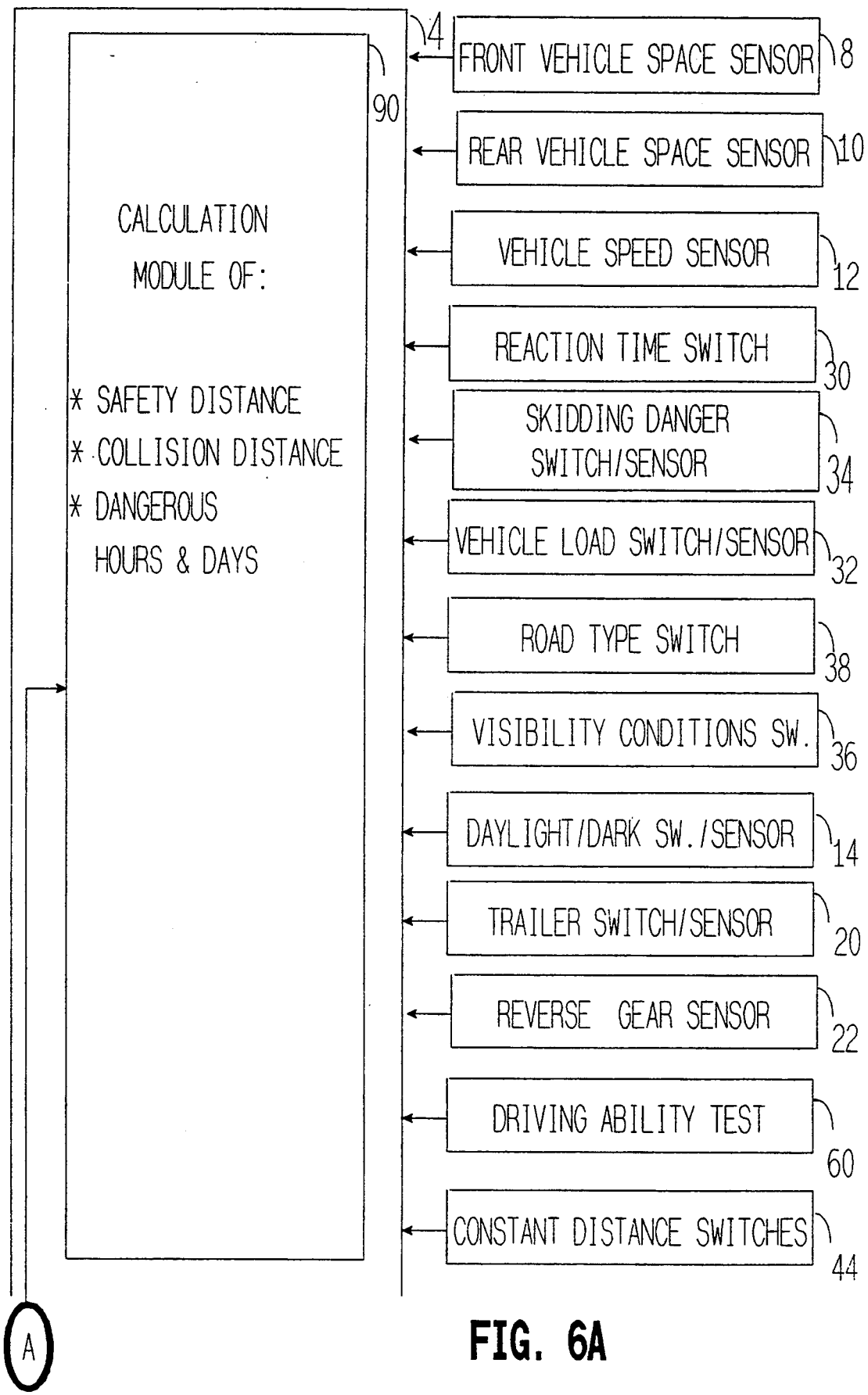
FIGS. 6A and 6B illustrates the microcomputer in the anti-collision system of FIG. 1 and all the inputs into and the outputs therefrom.
Figure 6B:
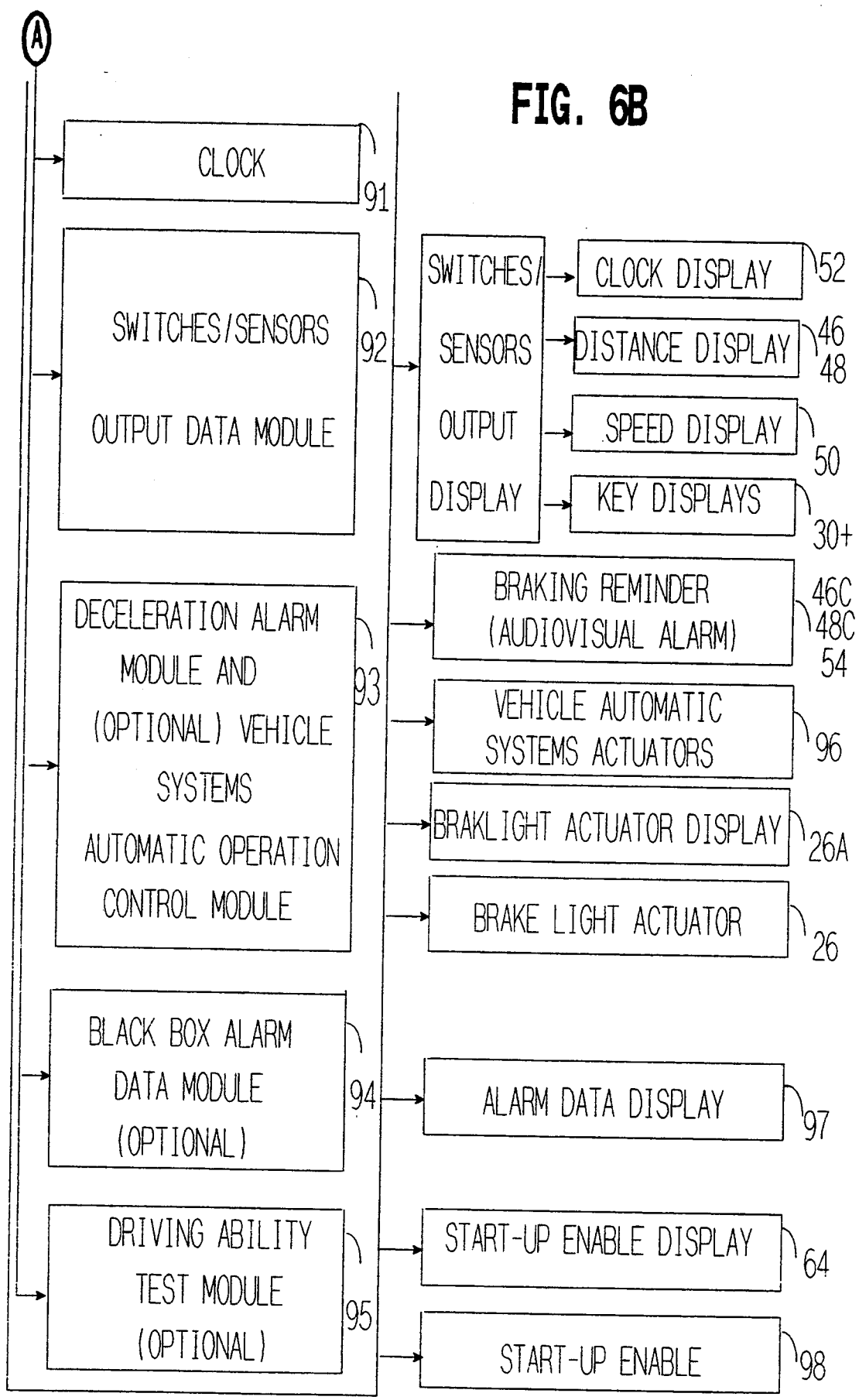

FIGS. 6a, 6b, are a block diagram illustrating the microcomputer 4 and its inputs and outputs described earlier which enable it to continuously monitor the operation of the vehicle and to actuate first a Safety alarm, and then a Collision alarm whenever the vehicle may enter a danger-of-collision situation according to the various preset parameters and automatic parameters introduced into the computer.

The microcomputer 4 as illustrated in FIGS. 6a, 6b is divided into various functional modules, as follows: a calculation module 90, which receives data concerning the various parameters briefly described above and as will be described more particularly below to enable it to make the necessary computations for actuating the Safety alarm and the Collision alarm; a real time clock 91 which keeps track of time in a real time manner; a switches/sensors output data module 92 which controls the various displays on the control panel; a deceleration alarm module 93, which controls the Safety alarm and Collision alarm on the control panel, the brake light actuator 26 and (e.g., in the case of a train) the vehicle brakes automatically; a black box module 94, which controls the information recorded into and read out of the black box 28; and a driving ability test module 95, involved in the driving ability test 60 in the control panel of FIG. 2, or 80 in the control panel of FIG. 5. The operation of each of these modules (except the clock 91) is described more particularly below with reference to the flow charts of FIGS. 9–14.

Thus, module 90 receives inputs from the front space sensor 8, the rear space sensor 10, and the vehicle speed sensor 12. Module 90 also receives inputs from the sensors in case there is no depressible key, e.g., the daylight sensor 14, the trailer sensor 20, the reverse gear sensor 22, the rain sensor 16, and the vehicle load sensor 18.

With respect to the preset parameters, the module 90 receives as inputs the reaction time as preselected by keys 30, the vehicle load condition as preset by keys 32, the skidding danger condition of the road as preset by keys 34, the visibility condition as preset by keys 36, the road-type condition as preset by keys 38, the daylight condition as preset by keys 40, as preset by key 32c.

Computer module 90 also receives an input from the mode selector 42 and the constant distance selector 44, to indicate whether the system is to operate according to the Collision Danger mode as preselected by key 42a to actuate the Safety alarm or Collision alarm whenever the vehicle approaches or is within the computed danger-of-collision distance, or the Constant Distance mode as selected by depression of key 42b. In the latter case, the alarm would be actuated whenever the vehicle is within a fixed distance as preset by depressing keys 44.

Computer module 90 also receives an input from the driving ability testing device 60 of FIG. 2 (or 80 of FIG. 5), which introduces the driver alertness condition as a parameter in the computation to be made by the computer, and/or as a condition to enable the vehicle for operation.

Computer module 90 also includes information about the vehicle braking distances as a function of speed. This is preferably in the form of a look-up table, for example, provided by the manufacturer for predetermined defined conditions concerning road type, skidding danger, vehicle load and tires pressure, and is stored in a ROM (read-only memory) of the microcomputer so that it can be changed periodically if necessary.

Computer module 90 also includes information concerning specific days during the year, or specific hours during the day, which are defined as dangerous driving days or hours. Examples of the latter include Saturday nights, Christmas Eve, New Year's Eve, dusk hours, etc., statistically known as dangerous driving times. This information could be introduced into the calculations by the computer in one of the safety factors or coefficients used by the computer in its calculations.

Computer module 92 controls the various displays, including the clock display 52, the distance display 46, 48, the speed display 50 and other displays such as the key displays, namely the indicator lights which illuminate each of the keys (30, etc.) on the control panel whenever the key is depressed, as described earlier.

The deceleration alarm module 93 controls the Safety and Collision alarms. As indicated earlier, the Safety alarm is first actuated to alert the driver that the vehicle is approaching the danger-of-collision distance from an object, or another rear vehicle is approaching the danger-of-collision distance. This alarm may be in the form of an Interrupted Audio alarm from speaker 54 and a Continuous Visual alarm from the collision danger display 46c or 48c. The Collision alarm, which is actuated when the vehicle is within the danger-of-collision distance, may be in the form of an Continuous, Higher-Intensity Audio alarm from speaker 54, and a Flashing Visual alarm from display region 46c or 48c.

The deceleration alarm module 93 further controls the brake light actuator 26 to alert drivers that may be trailing the vehicle involved, and also a brake light actuator display, shown at 26a in FIG. 6, to indicate this to the driver of the vehicle equipped with the safety system.

In some vehicles, such as a train or aircraft, the described system may also be provided with an actuator for automatically effecting a control of the vehicle, e.g., for automatically actuating the brakes in a train, or a steering control in an aircraft, in response to a danger-of-collision condition. This is schematically indicated by block 96 in FIG. 6 as controlled by the deceleration alarm module 93.

The black box module 94 controls various displays, generally indicated by block 97 in FIG. 6b, carried by the black box itself to read out the information recorded in the black box concerning alarm incidents which occurred, including the time, speed of the vehicle, and distance from he object, for each alarm incident.

The driving ability test module 95 controls a start-up enable device, generally designed 98, which enables the vehicle to be operated only when the test has been satisfactorily passed, and a display, such as display 64 in FIG. 2, indicating that the driver has satisfactorily passed the test and therefore the vehicle is enabled for operation.

Figure 7:
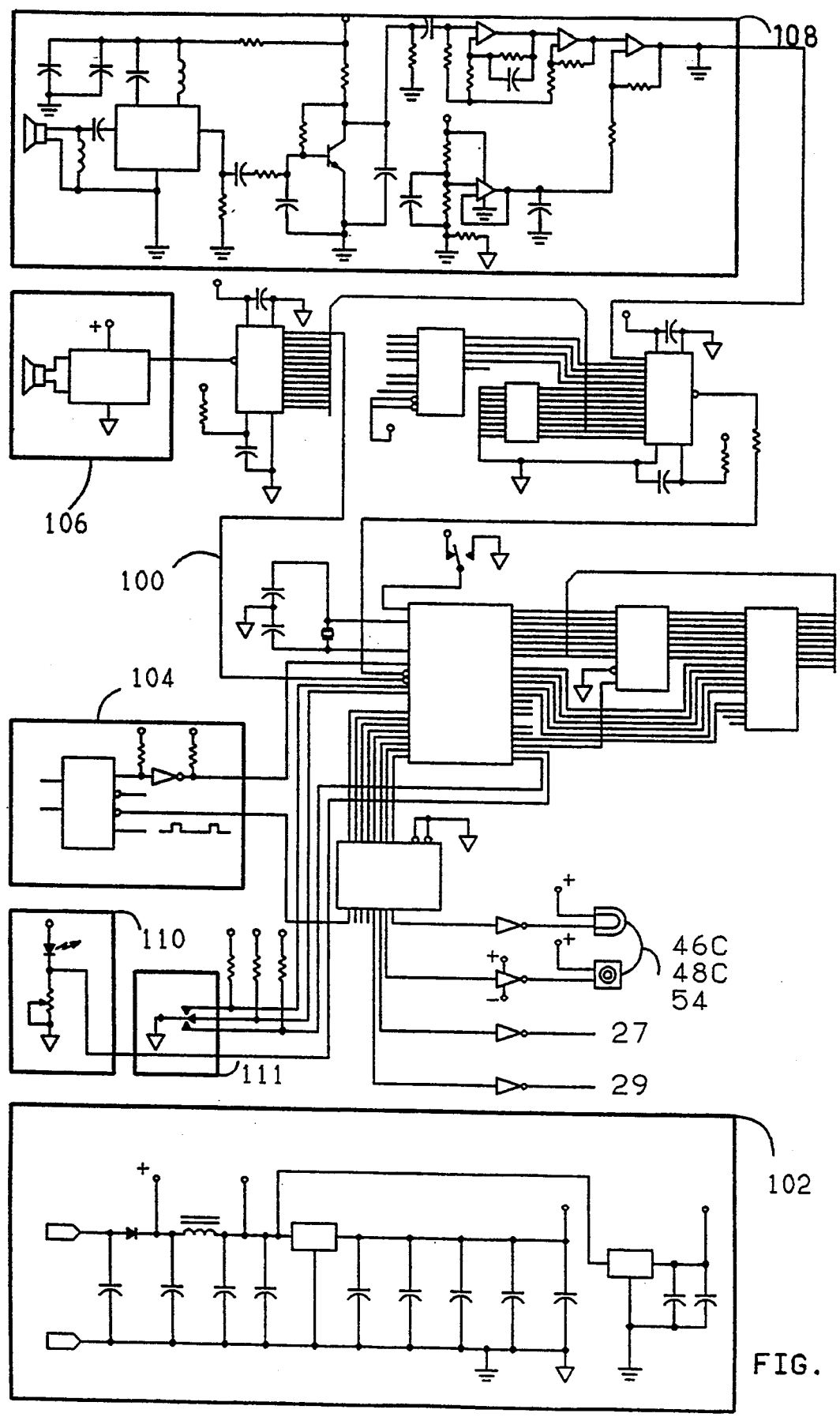
FIG. 7 is a circuit diagram illustrating one form of electrical circuit which may be used.

FIG. 7 is a circuit diagram of the microcomputer 4 and the other components of the electrical system. The microprocessor is indicated by block 100, its power supply by block 102, and its watchdog circuit by block 104. It includes a transmitter 106 and a receiver 108 for transmitting and receiving the pulses (e.g., RF, ultrasound, laser, IR, etc.) in the front space sensor 8 and the rear space sensor 10 for measuring the distance of the vehicle from objects in front of, and to the rear, of the vehicle, respectively. The microprocessor 100 includes inputs from all the automatic sensors, and from the presettable keys on the control panel, as described above. For purposes of example, only one of the sensors, indicated schematically at 110, and only one of the presettable keys indicated schematically at 111, are shown as inputs into the microprocessor. Since the circuit illustrated in FIG. 7 is well known and commercially available, further details of its structure and mode of operation are not set forth herein.

Distance Determination

As indicated earlier, the distance of the vehicle from an object is determined by the front space sensor 8 with respect to objects in front of the vehicle, and by the rear space sensor 10 with respect to objects at the rear of the vehicle. Each of these space sensors may be of known construction, including a transmitter as indicated at 106 in FIG. 7, and a receiver as indicated at 108. Thus, pulses are continuously transmitted by each transmitter, and the echoes from the objects in front of or to the rear of the vehicle are received by the respective receiver. The computer then measures the round-trip time from the pulse transmission to the echo reception in order to determine the distance of the vehicle from the object.

Figure 8:
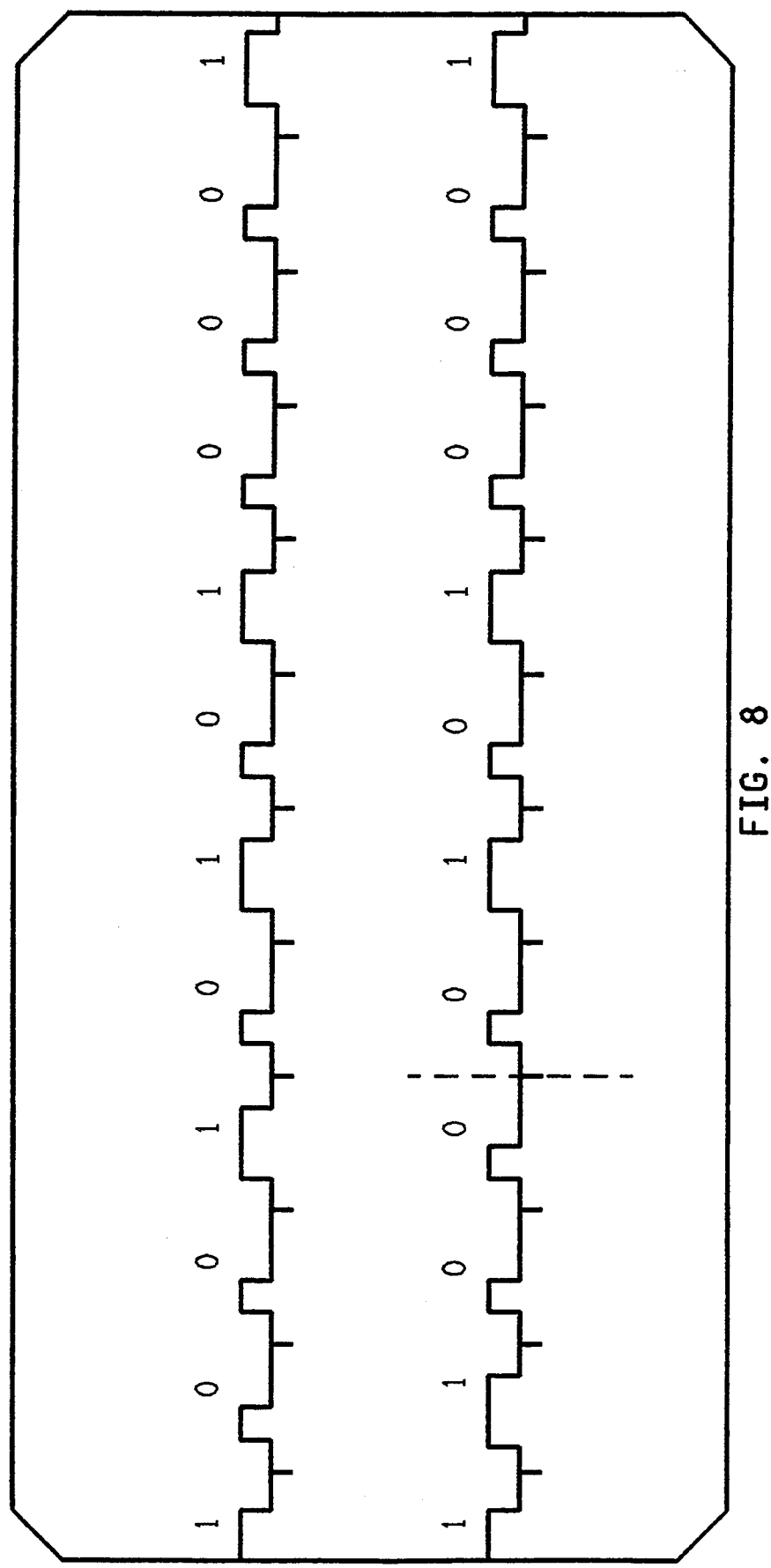
FIG. 8 illustrates one example of a pattern of pulses that may be used by the vehicle in determining its distance from an object.

FIG. 8 illustrates an example of the pattern of pulses transmitted by the transmitters. Each pulse is identified by a twelve-bit code. As shown in FIG. 8, the first eight bits do not change and identify the vehicle transmitting the pulses, whereas the next four bits change with each transmission and thereby identify the pulse then being transmitted, such that the computer can compare the return pulse with the transmitted pulse and thereby determine the round-trip time of the respective pulse. The receiver is "opened" to receive echoes for a predetermined "window time" so as to eliminate echoes from distances which are defined as too long.

OPERATION

General

The operation of the described anti-collision system is illustrated in the flow charts of FIGS. 9-14. The abbreviations included in the flow chart are identified by the following table:

TABLE

| | |
|---|---|
| AS | Approach speed |
| A | Maximum permissible time for performing driving ability test |
| AL | Alarm |
| ALSF | Alarm stopping front counter |
| ALSR | Alarm stopping rear counter |
| ALCF | Alarm collision front counter |
| ALCR | Alarm collision rear counter |
| ALFA | Alarm stopping front accumulator |
| ALRA | Alarm stopping rear accumulator |
| AM | Alarm mode |
| BD(AS) | Braking distance as a function of approaching speed |
| BF | Braking factor |
| CL | Carload or vehicle load |
| CD | Collision distance |
| CDM | "Constant Distance" mode distance |
| CSF | Collision safety factor |
| DL | Daylight/darkness |
| DD | Driving duration |
| DDHF | Dangerous driving hours factor |
| FADR | Front alarms to driving duration ratio |
| I | Counter |
| ICD | Constant Distance Alarm Counter |
| M | Maximum permissible time for checking collision danger existance in front when at rear there was no danger last time checked. |
| MD | Measured distance |
| RMD | Rear MD (measured distance) |
| RADR | Rear alarms to driving duration ratio |
| RV | Reverse gear (RV = '1' when reverse) |
| RT | Reaction time |
| RF | Reaction factor |
| RP | Road type |
| RRT | Rear RT (e.g., RRT=RT+3 Standard deviations) |
| RRF | Rear RF (RRF $\geq$ 1) |
| RBD | Rear BD |
| RCL | Rear CL |
| RBF | Rear BF (RBF $\geq$ 1) |
| RST | Rear ST (RST $\geq$ 1) |
| RSF | Rear SF (RSF $\geq$ 1) |
| Rx | Receiving echo |
| RSD | Rear stopping distance |
| RCSF | Rear CSF |
| SD | Stopping distance |
| SO | Sensors output |
| SK | Skidding danger |
| ST | Stopping factor |
| SF | Safety factor |
| T | Time |
| TFA | Total front stopping alarms |
| TRA | Total rear stopping alarms |
| TO | Time over (for the receiver "window-time") |
| Tx | Transmission command |
| TRx | Time of Rx |
| TTx | Time of Tx |
| V | Vehicle speed |
| VC | Visibility conditions |
| X | Trip number |

As shown in the foregoing table, many factors are to be included in making the various computations. These factors may be determined for each case in order to make the appropriate computation for actuating the collision alarm, and before it the safety alarm, as close as possible to the actual conditions at the time of driving, including the driver conditions, vehicle conditions, and the environmental conditions as described above. The ALSF and ALSR counters, the ALCF and ALCR counters, and the ALFA and ALRA accumulators in the above table, and referred to in the flow charts below, would be provided in the black box 28 which records all the incidents in which the safety alarm and collision alarm were actuated, including the time, vehicle speed and vehicle distance for each alarm incident.

Overall Operation

Figure 9:
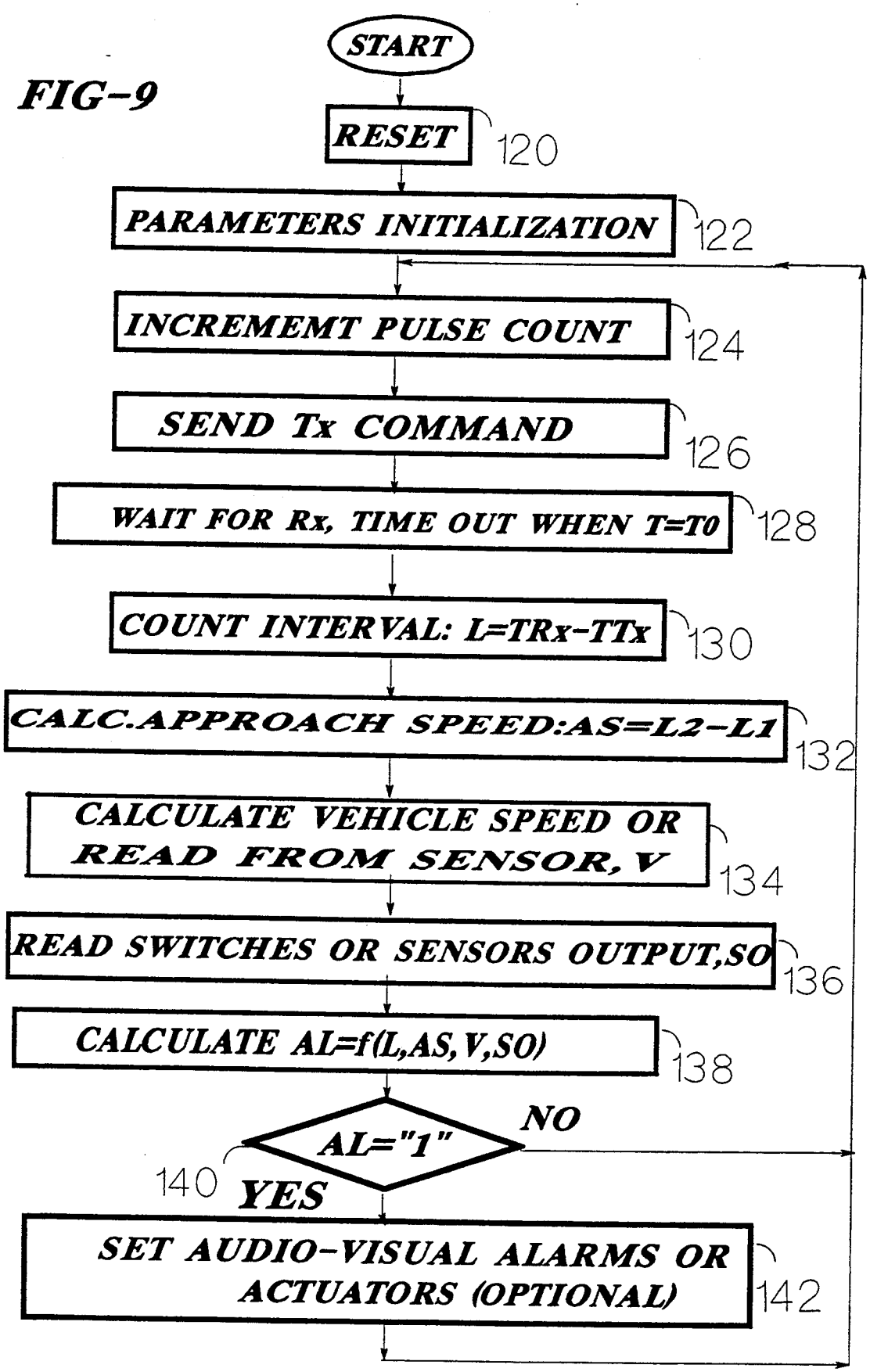
FIG. 9 is a flow chart illustrating the overall operation of the system.

The overall operation is illustrated in the flow chart of FIG. 9. Thus, after the system is reset (block 120), all the parameters are initialized (block 122), and the pulse transmitters in the front and rear space sensors 8 and 10 are incremented one pulse count (block 124), by incrementing the last four bits of the twelve-bit pulse, as described above with respect to FIG. 8. The pulse is then transmitted (block 12,5), and the time is measured until its echo is received within a limited duration (blocks 128, 130). This time is used for calculating the approach speed of the vehicle with respect to an object (block 132). The vehicle speed is then determined, e.g., as read from a speed sensor on the vehicle,, or as determined independently, e.g., by the Doppler effect (block 134). All the parameters as preset by the presettable keys on the control panel 6, as well as the outputs from the various sensors as illustrated in FIG. 1, are then read (block 136), and the computer then determines whether there is a collision danger, i.e., whether the measured distance is within the collision-of-danger distance (block 138). If so, it actuates the alarms; and if not, it returns to increment and transmit the next pulse (blocks 140 and 142).

Operation of the Calculation Module 90

As indicated earlier, the illustrated system includes two alarms, namely a Collision alarm which is actuated whenever the measured distance of the vehicle from an object is within the danger-of-collision distance as computed by the computer; but before that alarm is actuated, a Safety alarm is first actuated to alert the driver that the vehicle is approaching the above collision alarm distance. For example, the safety alarm may be actuated when the vehicle is determined to be within a distance which is increased by 25% as compared to the collision distance, in which case the collision distance is multiplied by a safety factor of 1.25 to determine the distance for energizing the safety alarm.

Figure 10A:
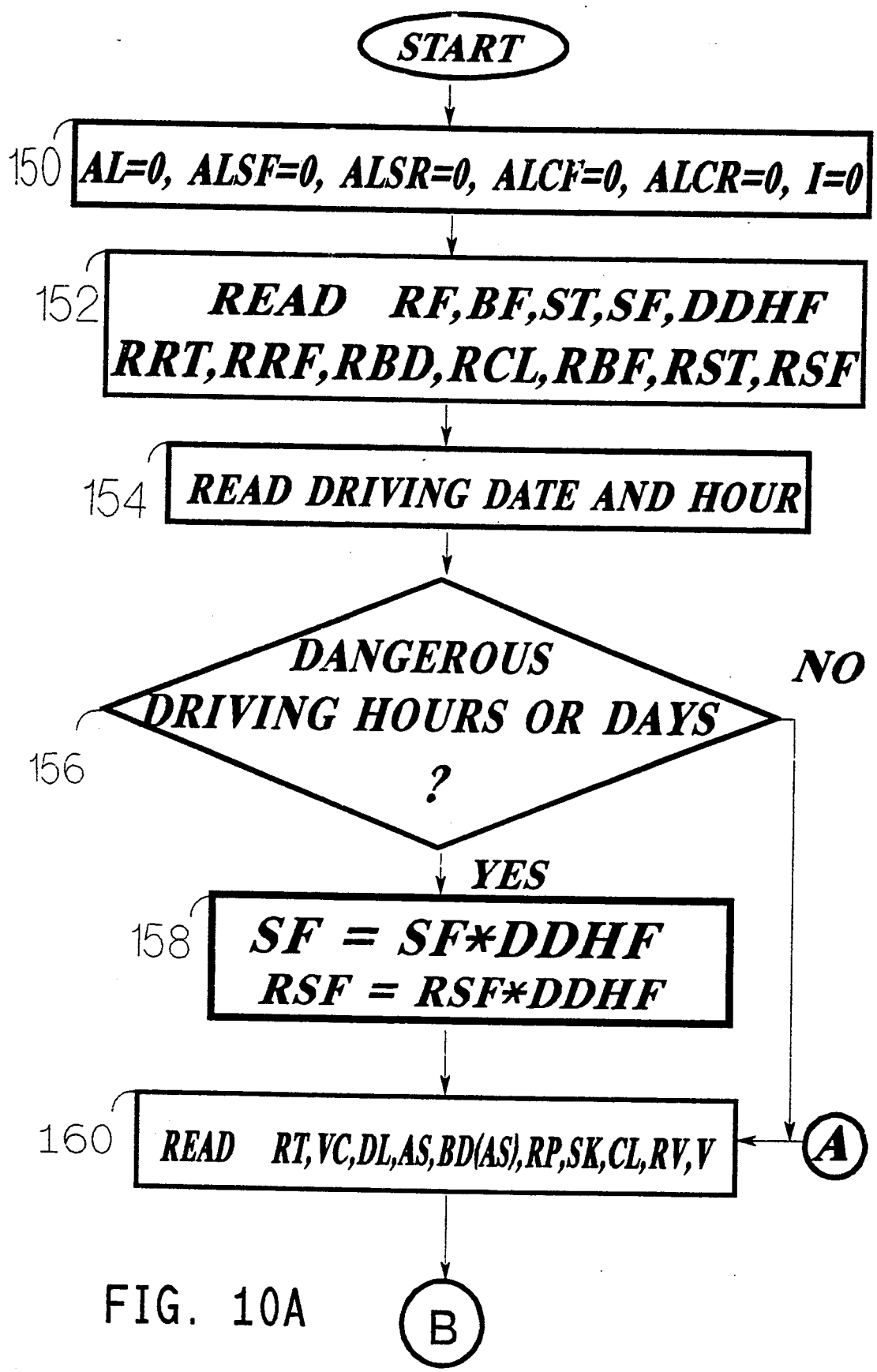
Figure 11A:
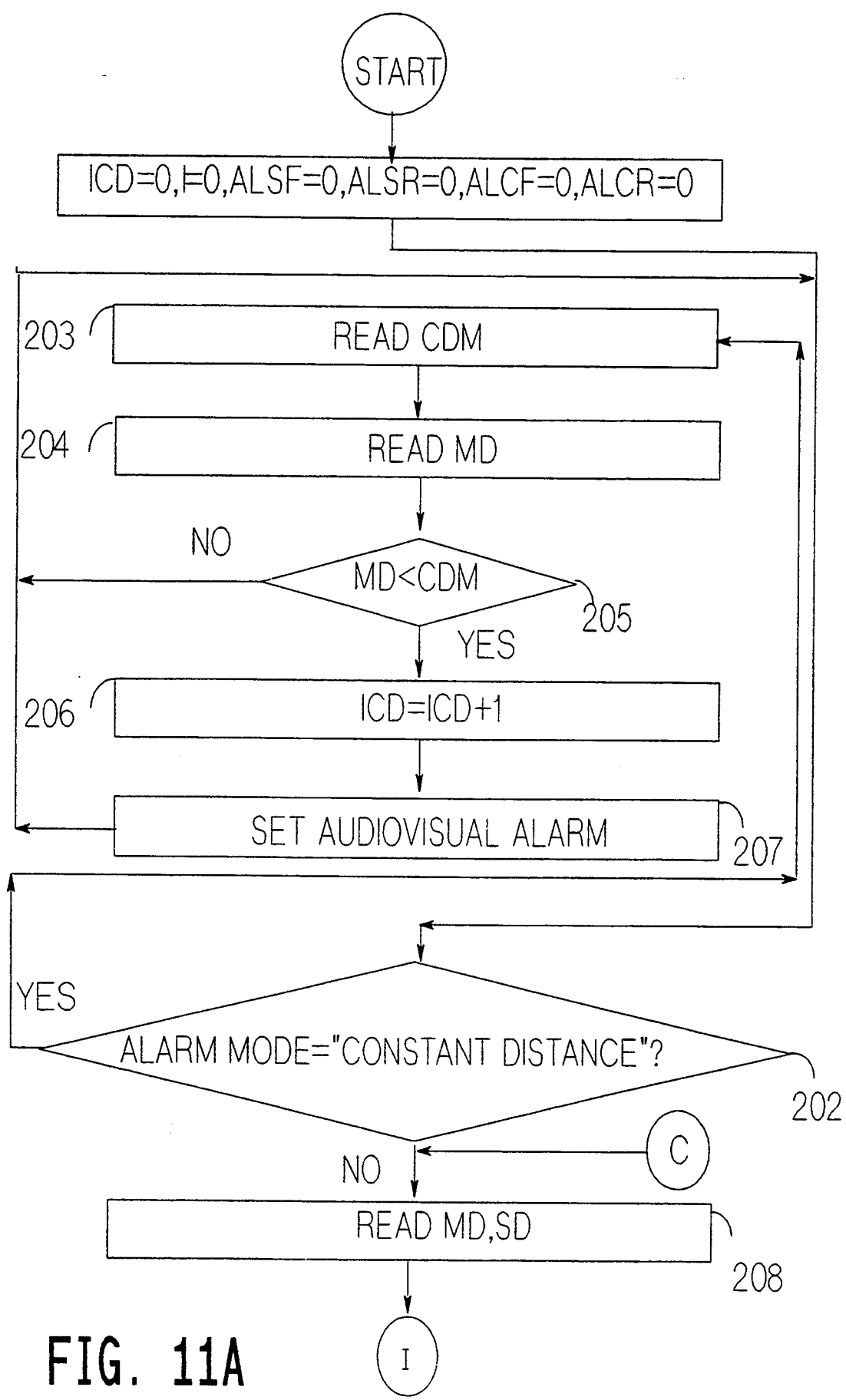
Figure 11B:
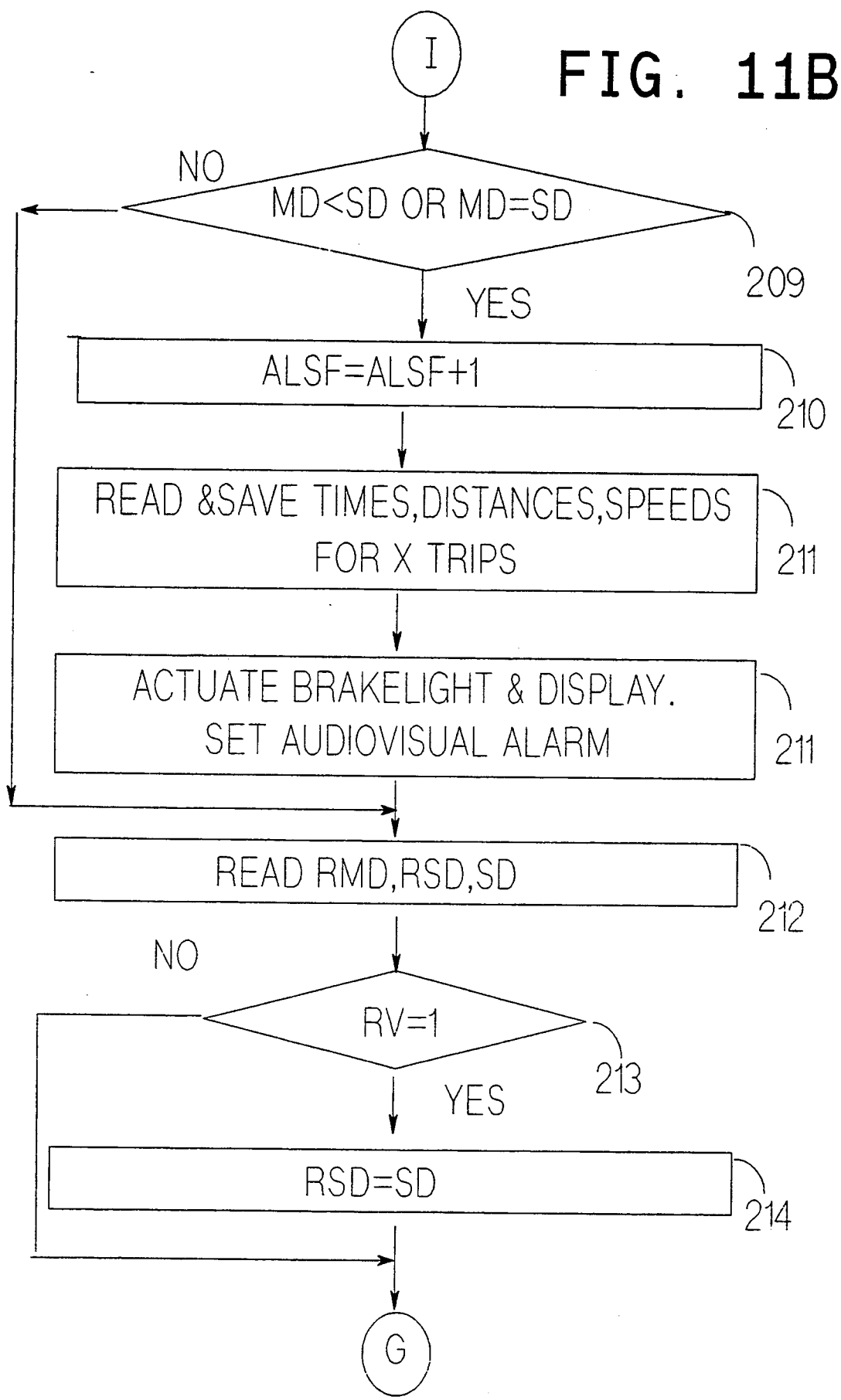
Figure 11C:
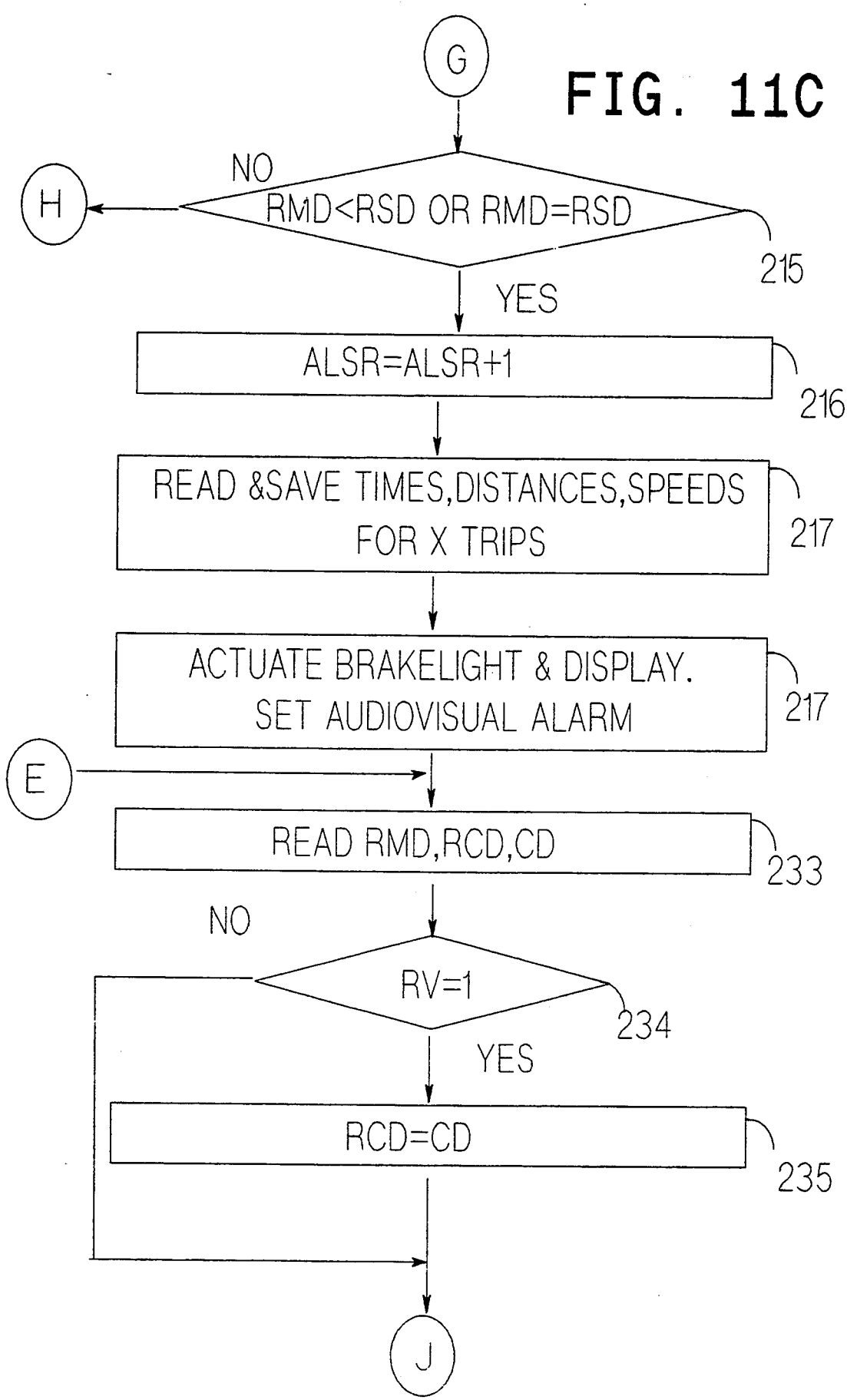
Figure 11D:
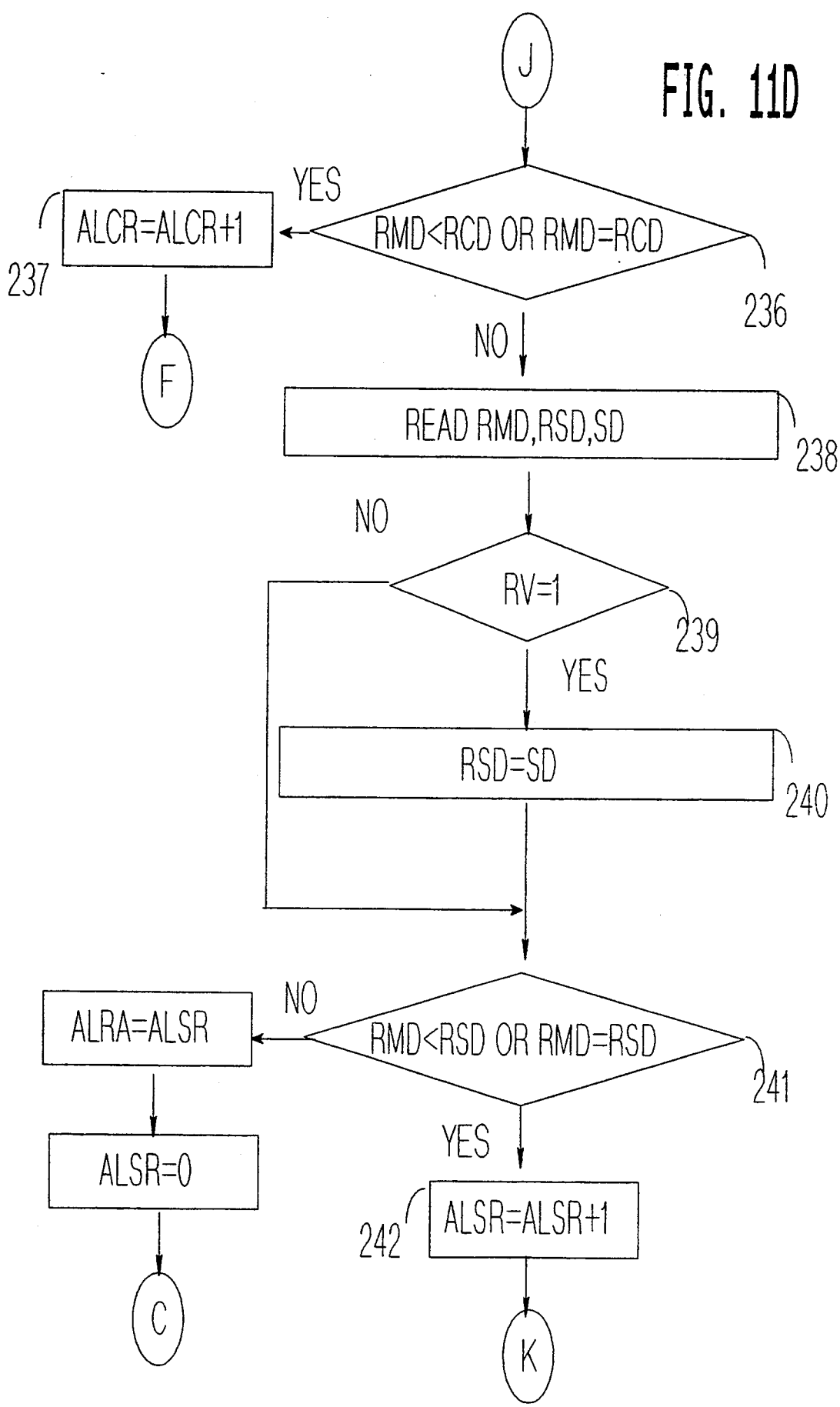
Figure 11E:
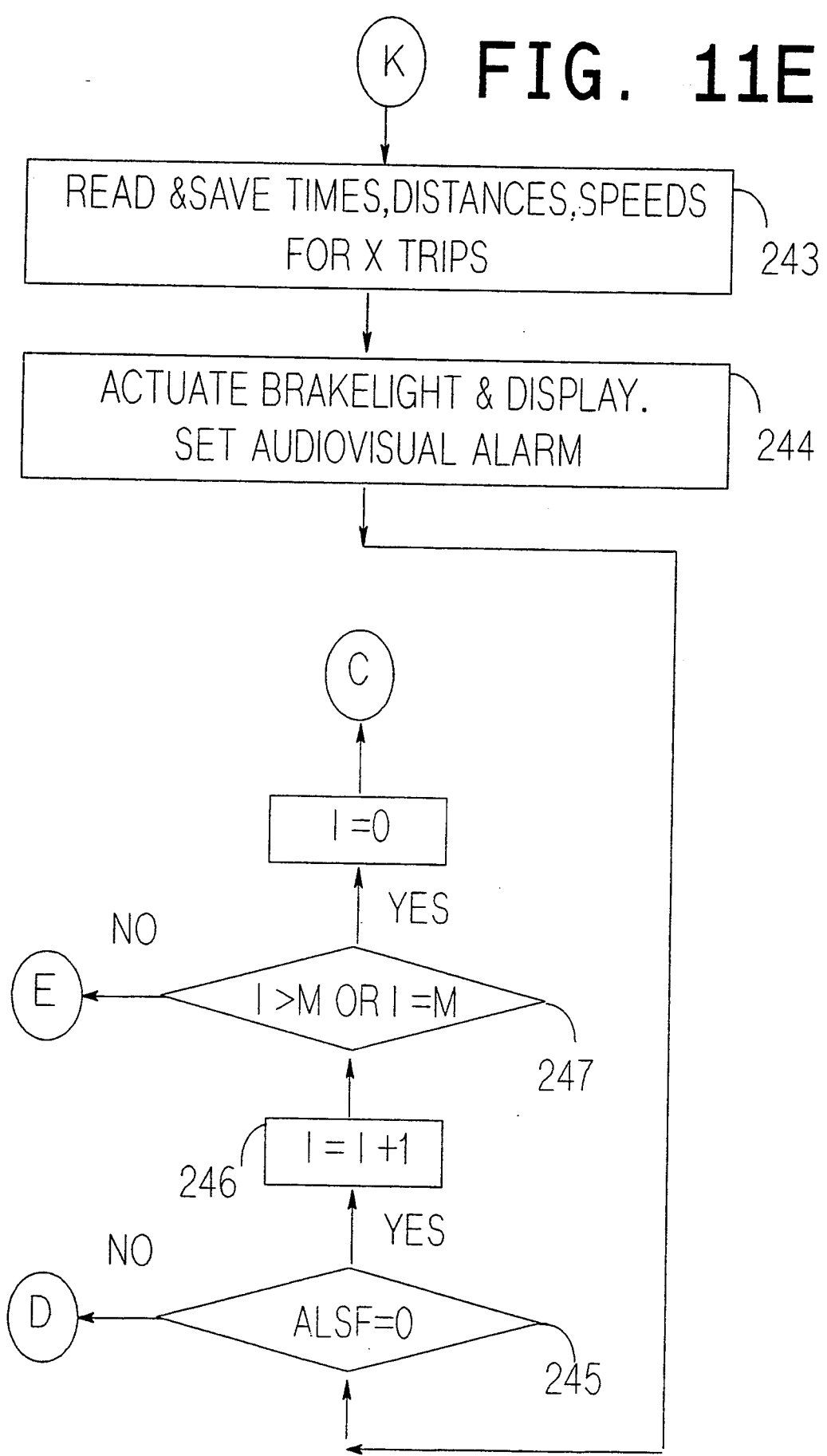
Figure 11F:
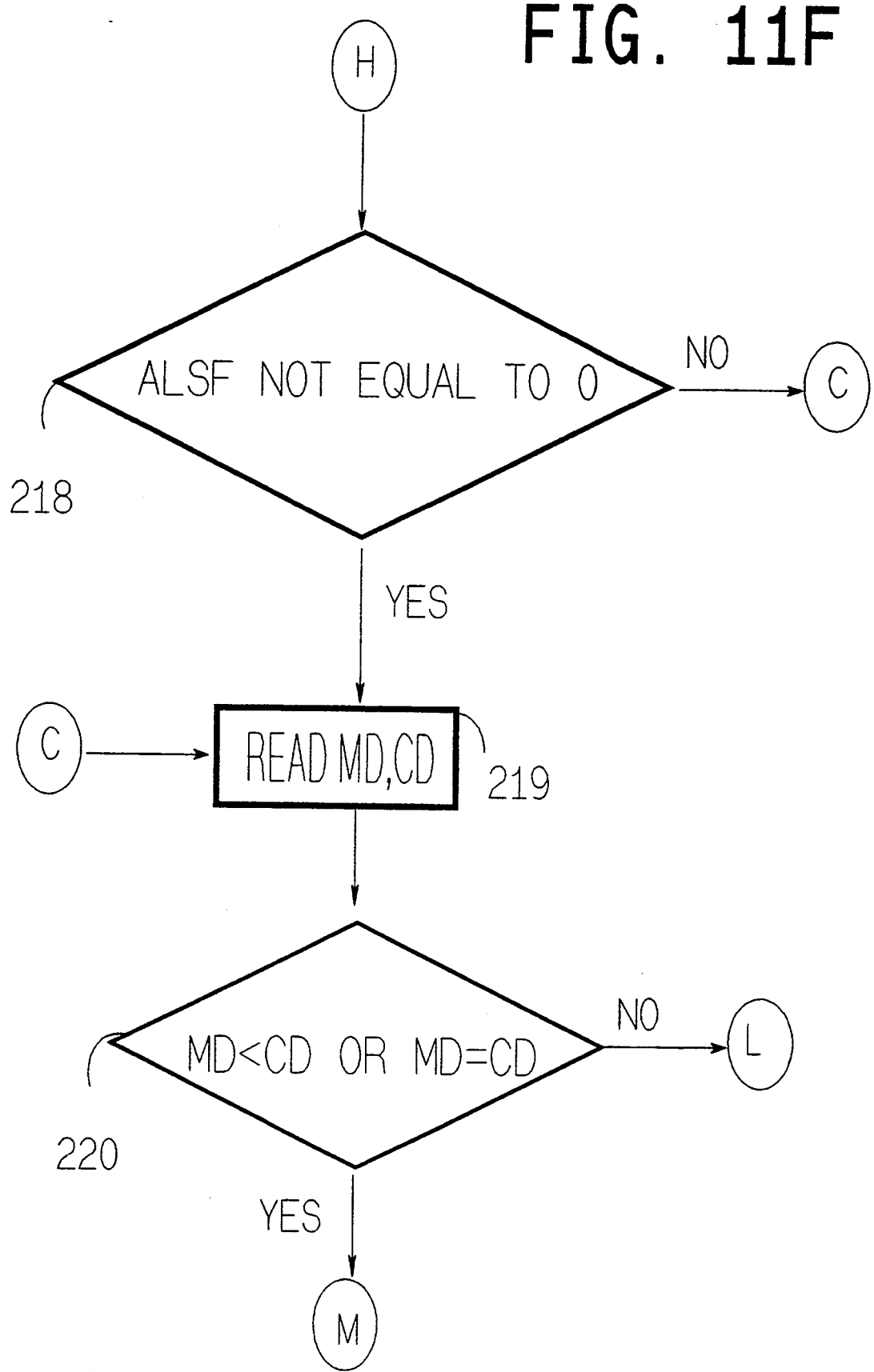
Figure 11G:
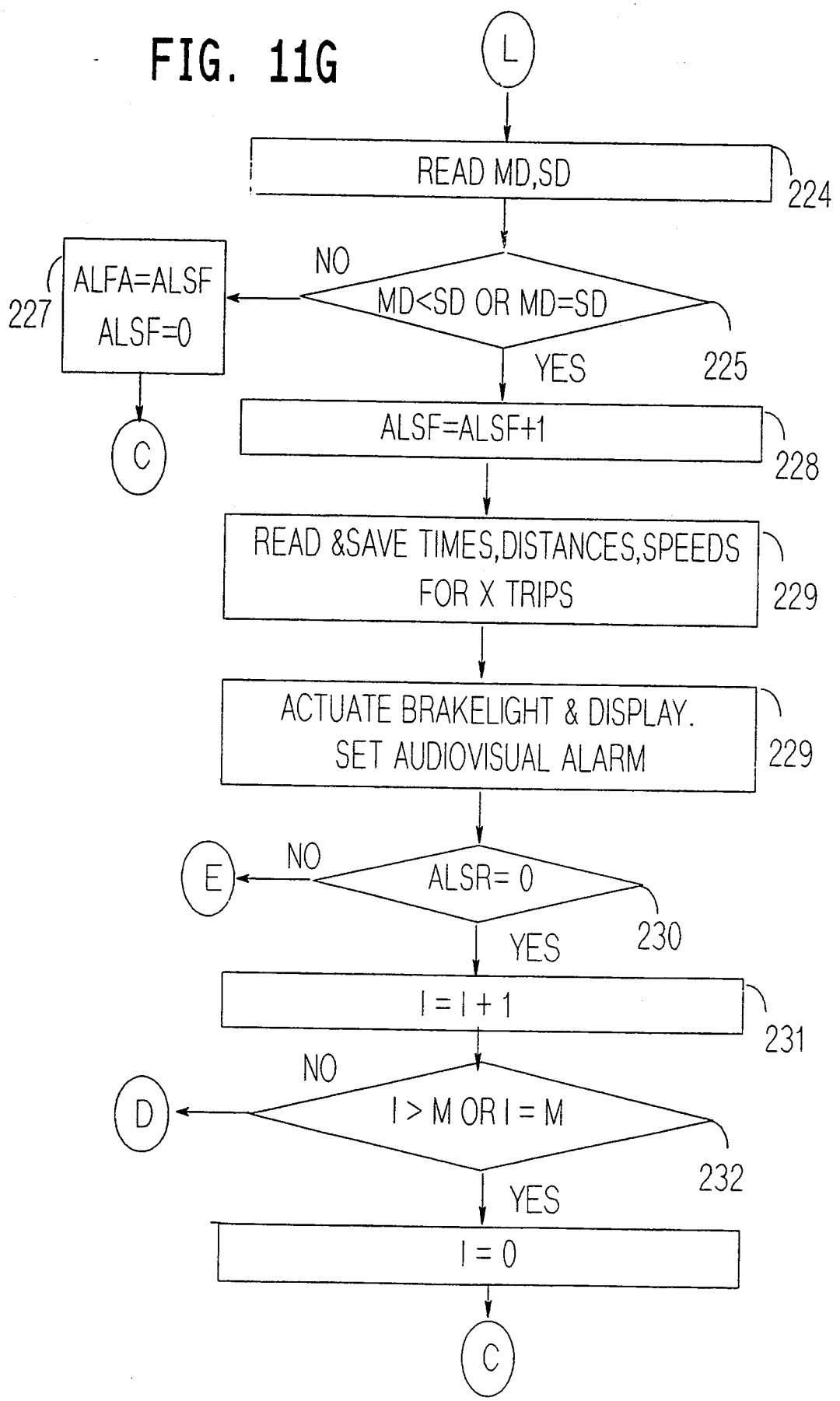

The foregoing is more clearly illustrated in the flow chart of FIGS. 10a, 10b which illustrates the operation of the calculation module 90.

Thus, the system is first initialized as shown by block 150, and then the various factors concerning the reaction, braking and stopping distances, and other parameters (representing the rear vehicle and driver parameters), that are not presettable from the keyboard, and are read into the computer as indicated by block 152. The driving date and hour are then read (block 154), and a determination is made whether that time is a dangerous time (e.g., a high-accident rate time, block 156). If so, safety factors (SF and RSF) are introduced to compensate for this danger time (block 158), before the reaction time (RT), as well as the other presettable parameters, including approach speed, braking distance as a function of approach speed, etc., as shown in box 160, are introduced.

The system then makes the computations illustrated (as an example) in block 162 to determine the stopping distance SD, which is equal to the reaction distance plus the braking distance multiplied by a stopping factor ST and a safety factor SF. In the illustrated example, the stopping distance is the sum of the reaction distance and the braking distance. The reaction distance is the product of the reaction time, visibility condition, daylight condition, reaction factor and speed; and the braking distance is the product of the braking distance (as supplied by the manufacturer), road type, skidding danger, vehicle load and braking factor. The stopping distance (SD) includes further safety factors, and determines when the safety alarm will be actuated to first alert the driver of an approaching collision danger.

A determination is also made of the collision distance CD which is equal to the stopping distance SD divided by the collision safety factor CSF, e.g., 1.25 in the example illustrated above, such that should the distance between the vehicle and the object come within the collision distance CD, the collision alarm is then actuated.

The foregoing calculations of stopping distance SD and collision distance CD with respect to objects at the front of the vehicle are also made with respect to objects at the rear of the vehicle, these calculations being RSD and RCD, respectively, also shown in block 162.

Whenever the distance between the vehicle and an object to the front of the vehicle or to the rear of the vehicle comes within the stopping distance SD and the collision distance CD, the system operates according to the deceleration alarm module 93, as indicated by block 164.

Operation of Deceleration Alarm Module 93

The function of this module is to actuate the safety alarm or collision alarm, and also the brake light, at the proper time, and also to record the events within the black box 128. The operation of this module is more particularly illustrated in FIG.11a–11h.

After the system initializes (block 200), it checks to see whether the Alarm mode or the Constant Distance mode has been preset (block 202). If the Constant Distance mode has been preset, it continuously checks to determine whether the measured distance is less than the preset constant distance, and if so, it actuates the alarm (blocks 203–207); at the same time, it also increments the constant distance alarm counter (block 206) in the black box 28.

If the system is in the Collision Danger mode, it continuously compares the measured distance with the computed stopping distance, and whenever the measured distance is equal to or less than the computed stopping distance, it actuates the alarm; at the same time, it increments an alarm counter (ALSF) and also records the time, distance and speed in the black box (blocks 208–211).

The above operations are repeated with respect to the rear measured distance (blocks 212–217). During these operations, the system also checks to determine whether the vehicle is driving in reverse, and if so, the reverse stopping distance (RSD) is considered to be the stopping distance (SD), as shown by blocks 213, 214.

This information is also recorded in the black box (block 217). During this operation, the system also checks to see whether there was a problem with the front (block 218); if not, it repeats the foregoing operations (starting with block 208). If, however, there was a problem at the front, the system compares the measured distance with the collision distance (blocks 219, 220). If there is a collision danger, the Collision alarm is actuated (block 221); at the same time, the Collision alarm counter in the black box is incremented (block 222), and the time, distance and speed of the vehicle are recorded in the black box (block 223). If the system is included in an anti-collision system for trains, then the actuation of the collision alarm would also be accompanied by the actuation of the braking system of the train (block 221).

Where the measured distance was greater than the collision distance, the system monitors the measured distance now with the stopping distance and if it is greater than the stopping distance, the value in counter ALSF is accumulated in accumulator ALFA, and then the counter is reset to zero (blocks 224–227). The system then returns to the beginning of the loop, point C.

Whenever the measured distance is equal to or less than the stopping distance (block 225), the system increments the alarm stopping front counter (block 228), records the time, distance and speed in the black box, and also actuates the safety alarm (block 229).

The system also checks to see whether there had been a problem with the rear the last time this had been checked; if so (i.e., ALSR not equal to zero), the system proceeds to point E. As will be described more particularly below, point E checks to determine whether there is a rear collision danger.

If there had not been a problem with the rear the last time it was checked, and the last time it was checked is less than a predetermined maximum time (blocks 231,232), the system again checks to determine whether there is a collision danger in the front (point D); but if the maximum time was exceeded, it then returns to the beginning of the loop (point C).

When it was determined that there is a problem with the stopping distance which actuated the Safety alarm (block 215) or that there was a problem with the stopping distance at the rear (block 230), the system checks whether there is a Collision danger at the rear (block 233). If the vehicle is being driven in reverse (block 234) it considers the computed rear collision distance to be the same as the front collision distance (block 235), and then checks to determine whether the measured rear distance is equal to or less than the computed rear collision distance (block 236). If there is a danger of collision (block 237), the Collision alarm is actuated, etc. (as described above with respect to point F).

If there is no danger of a rear collision, a check is again made to determine whether the vehicle is in reverse, and if so, the computed Rear stopping distance is considered to be the same as the front stopping distance (blocks 239, 240). The system then checks to determine whether the rear measured distance is equal to or less than the computed rear stopping distance (block 241). If the rear measured distance is greater than the computed rear stopping distance (block 241), the value in counter ALSR is introduced into accumulator ALRA, counter ALSR is reset to zero, and the system then returns to the beginning of the loop, point C.

If, however, the rear measured distance is equal to or less than the computed stopping distance, the Safety alarm and the brake light are actuated, and the same operations are repeated with respect to the information stored in the black box as described above (blocks 242–244). The system then checks to determine whether there had not been a previous problem with the front stopping distance, and whether the last check had been within a previous time interval. If so, it returns to check the collision danger from the rear; but if not, it returns to the beginning of the loop at point C, or continues to check the front collision danger (point D) if there was a problem at the front (i.e., ALSF is not equal to "0").

Operation of the Switches/Sensors Module 92

Figure 12A:
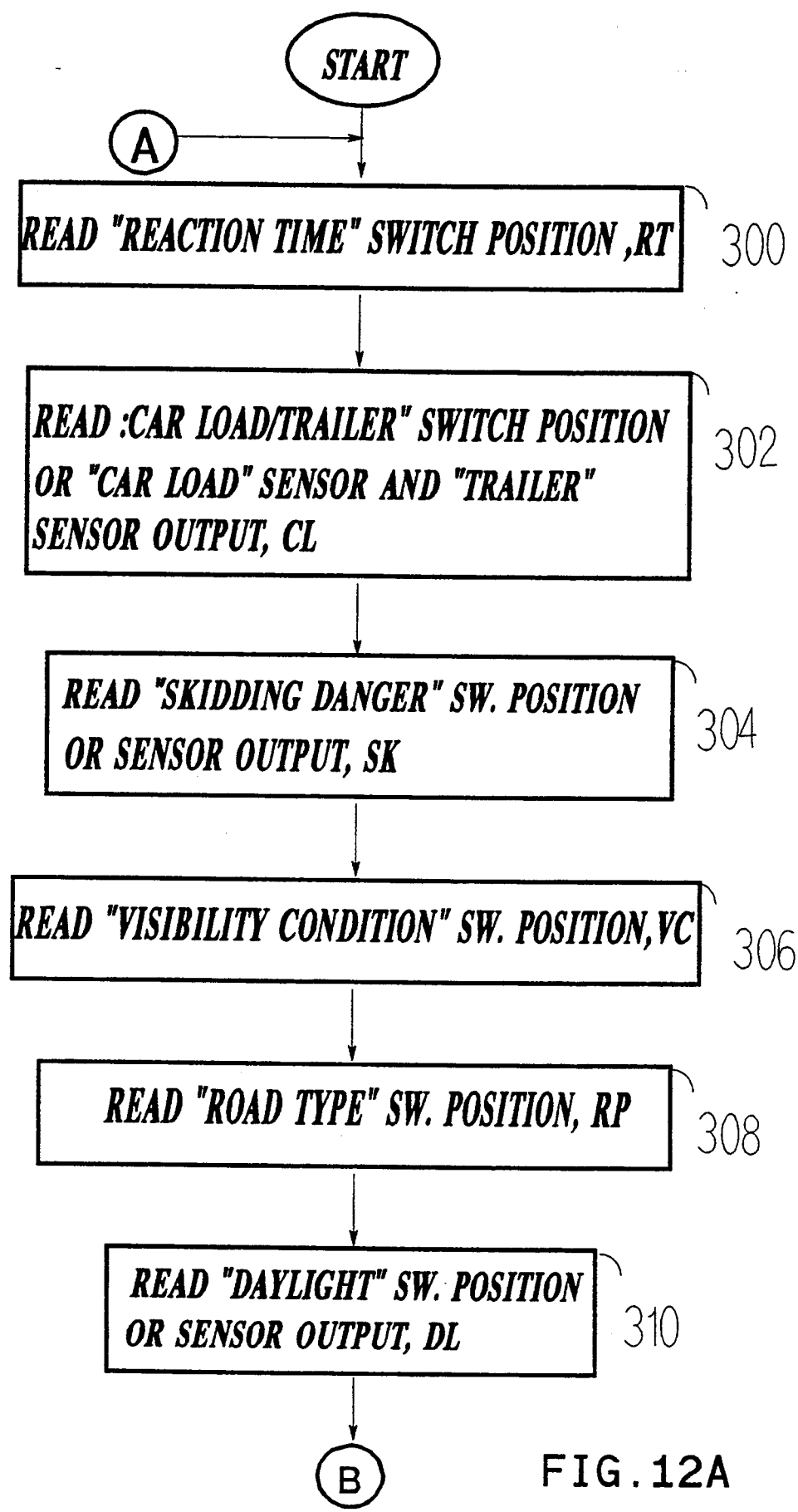
FIGS. 12A-12B, together, constitute flow charts illustrating the operation of the output data module in the microcomputer of FIGS. 6A and 6B.
Figure 12B:
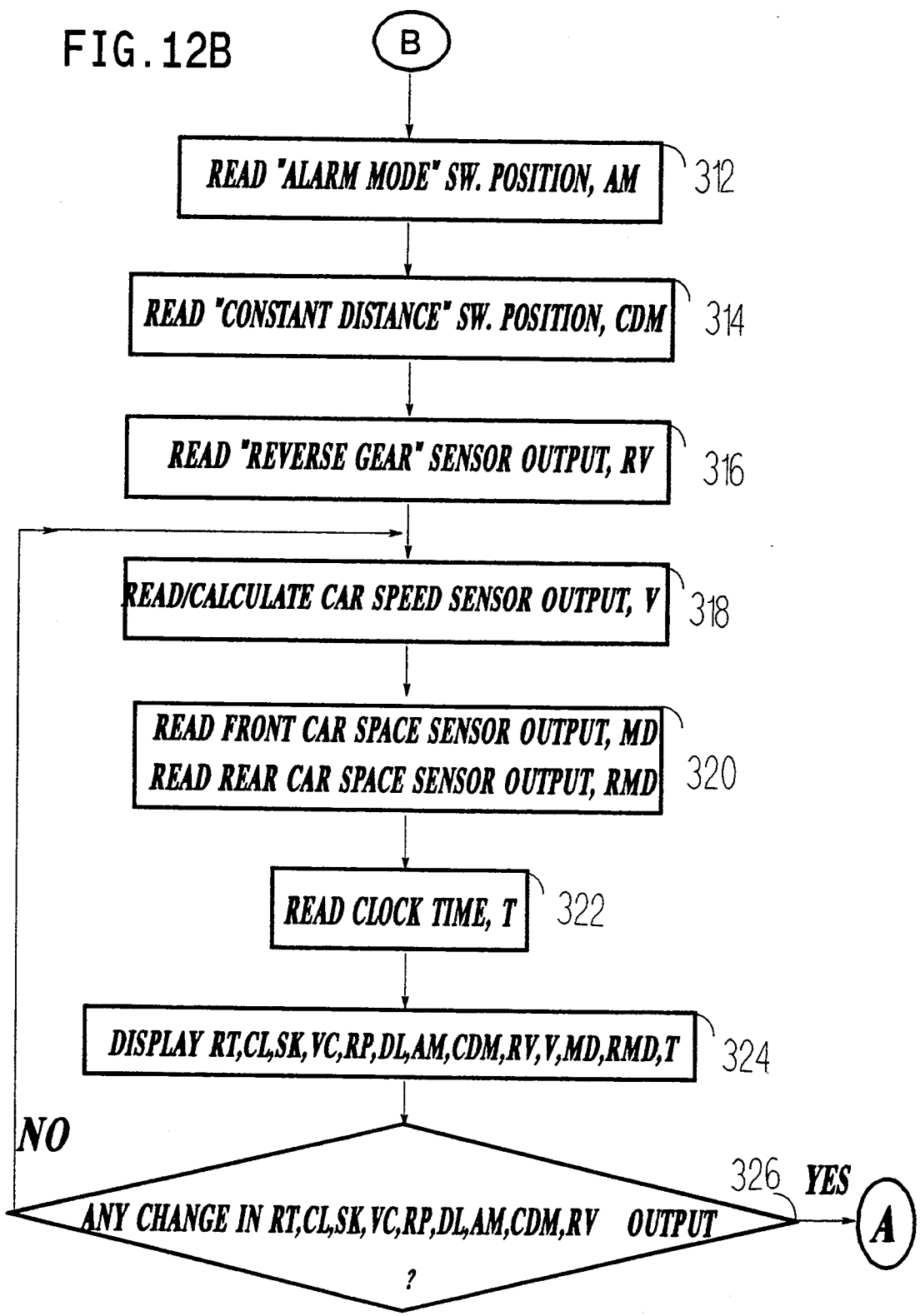

FIGS. 12a, 12b, are a flow chart illustrating the operation of the switches/sensors output data module 92.

During this operation, the system first reads the presettable parameters according to the settings of the reaction time key 30 (block 300), the carload-trailer key 32 (block 302), the skidding danger key 324 (block 304), the visibility condition key 36 (block 306), the road type key 38 (block 308), the daylight key 40 (block 310), the Alarm mode key 42 (block 312), and the constant distance key 44 (block 314). The system also reads the position of the reverse gear sensor output schematically shown at 22 in FIG. 1 (block 316), reads or calculates the car speed (block 318), reads the front and rear car distances (block 320), and reads the clock time (block 322). The foregoing parameters are displayed by actuating the clock display 52, the distance displays 46, 48, the speed display 50, and the key display 30, etc. (block 324). If no change is made in these settings, the system continues to read or calculate the car speed, etc., until a change occurs, at which time the system begins the loop at point A.

Operation of the Black Box Module 94

As indicated earlier, the black box (28, FIG. 1) maintains a record of all incidents during which the safety alarm and collision alarm were actuated, recording the time, speed and relative distance between the vehicle and object for each such occurrence. This record is accumulated within the black box and may be read out at any desired time, e.g., by operators of taxicabs, buses, trucks, trains or aircraft, to provide a record of what occurred during the vehicle trip. This information can be recorded for a predetermined number of trips.

Figure 13A:
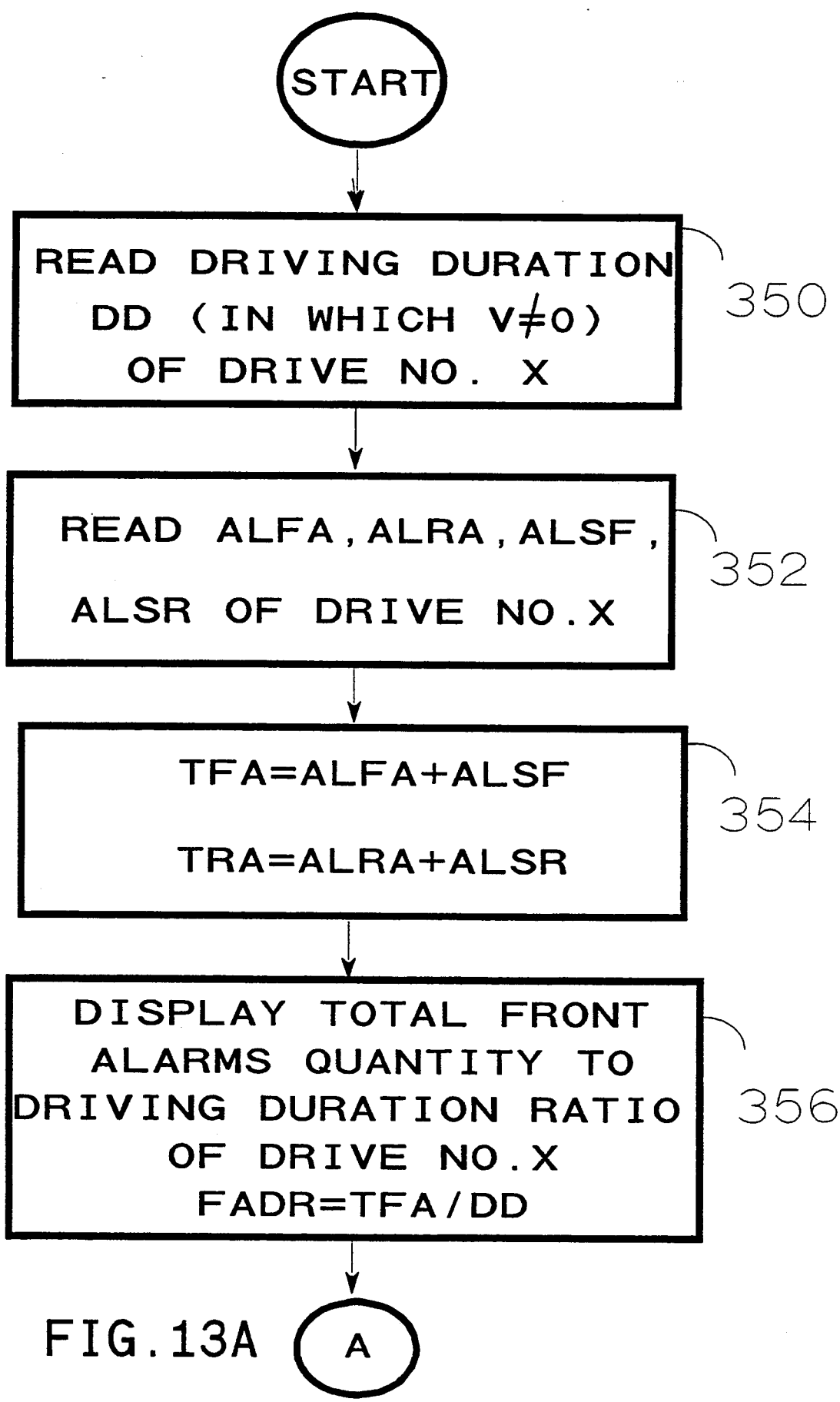
FIGS. 13A-13B, together, constitute flow charts illustrating the operation of the black box module in the microcomputer of FIGS. 6A and 7B.
Figure 13B:
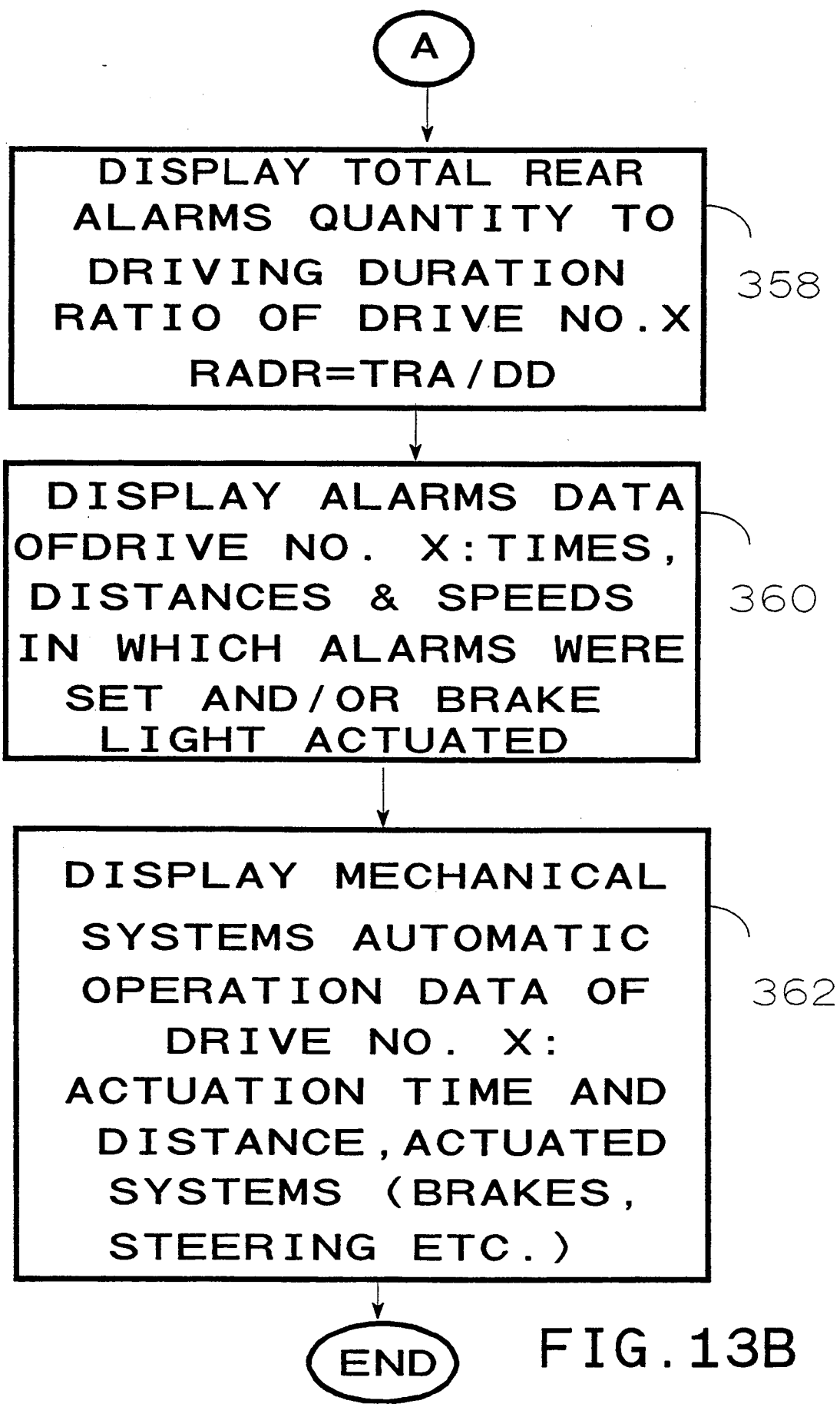

The flow chart of FIGS. 13a, 13b more particularly illustrates the operation of the black box module 94, wherein it will be seen that a record is made with the driving duration at all times in which the vehicle is moving during the current trip (block 350), during which the various accumulators (ALFA and ALRA), and counters (ALSF and ALSR) are recorded (block 352) and accumulated (block 354). These are used to calculate the total number of front stopping alarms and the ratio thereof to the driving duration, and may be displayed at any time when requested (e.g., by using the blackbox alarm data menu 78 illustrated in FIG. 4, blocks 356, 358 and 360). In the same way, the total collision alarms may be calculated and the ratio thereof to the driving duration.

In the case of trains or aircraft where the vehicle itself was automatically controlled, e.g., automatic actuation of the brakes in a train, this is also displayed (block 362).

Operation of Driving Ability Test Module 95

FIG. 2 illustrates one form of driving ability test, at 60, and FIG. 5 illustrates a more complicated driving ability test that may be used to determine the fitness of the driver to operate the vehicle. The result of this test may be used as one of the parameters indicating the condition of a driver to be used in calculating the collision distance before either the collision alarm or the safety alarm is actuated. The results of this test may also be used to disable the operation of the vehicle unless and until the driver has successfully passed the test. The latter operation is more particularly illustrated in the flow chart of FIGS. 14a–14d.

Figure 14A:
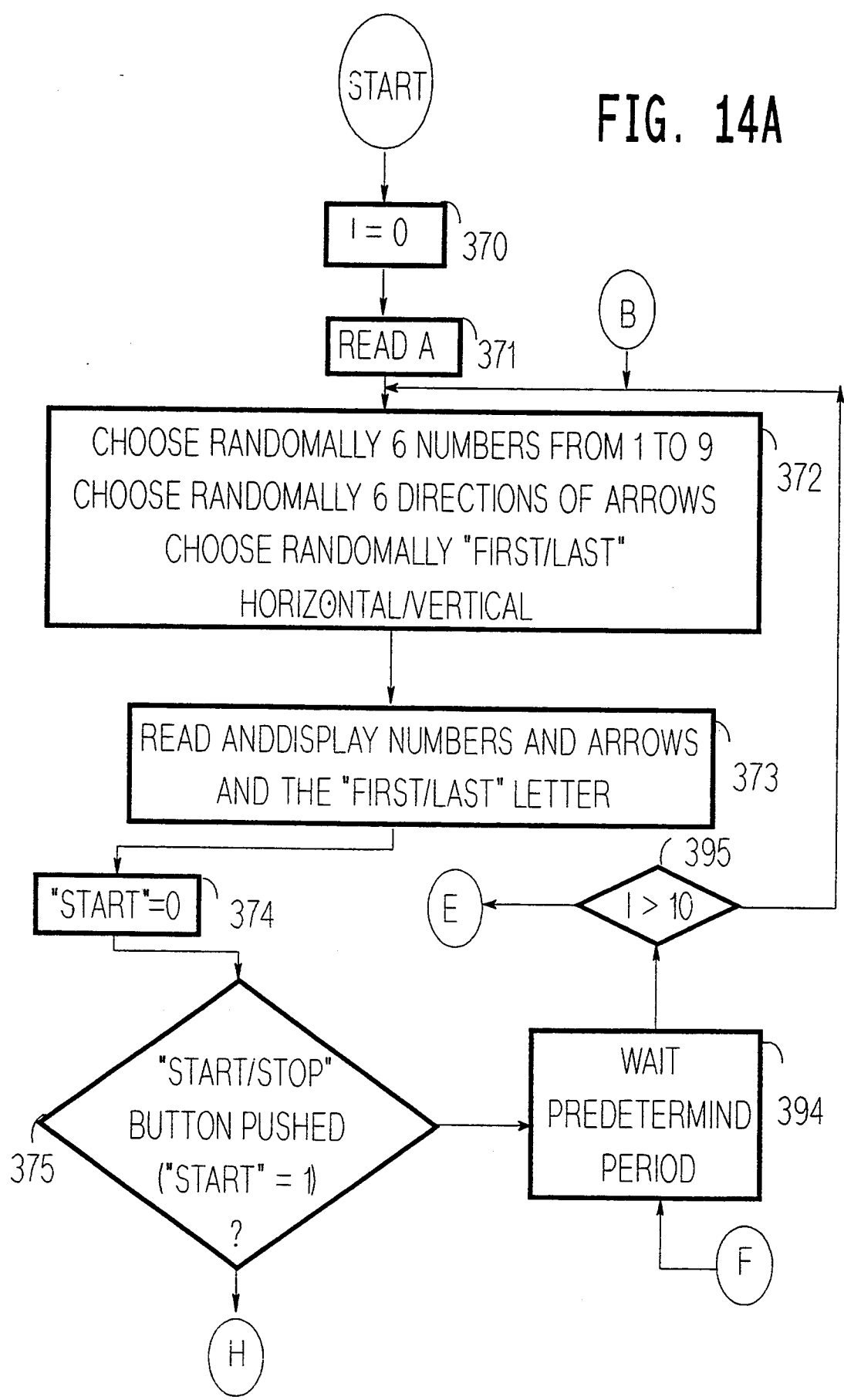
FIGS. 14A-14D, together, constitute flow charts illustrating the operation of the driving ability test module in the microcomputer of FIGS. 6A and 6B.
Figure 14B:
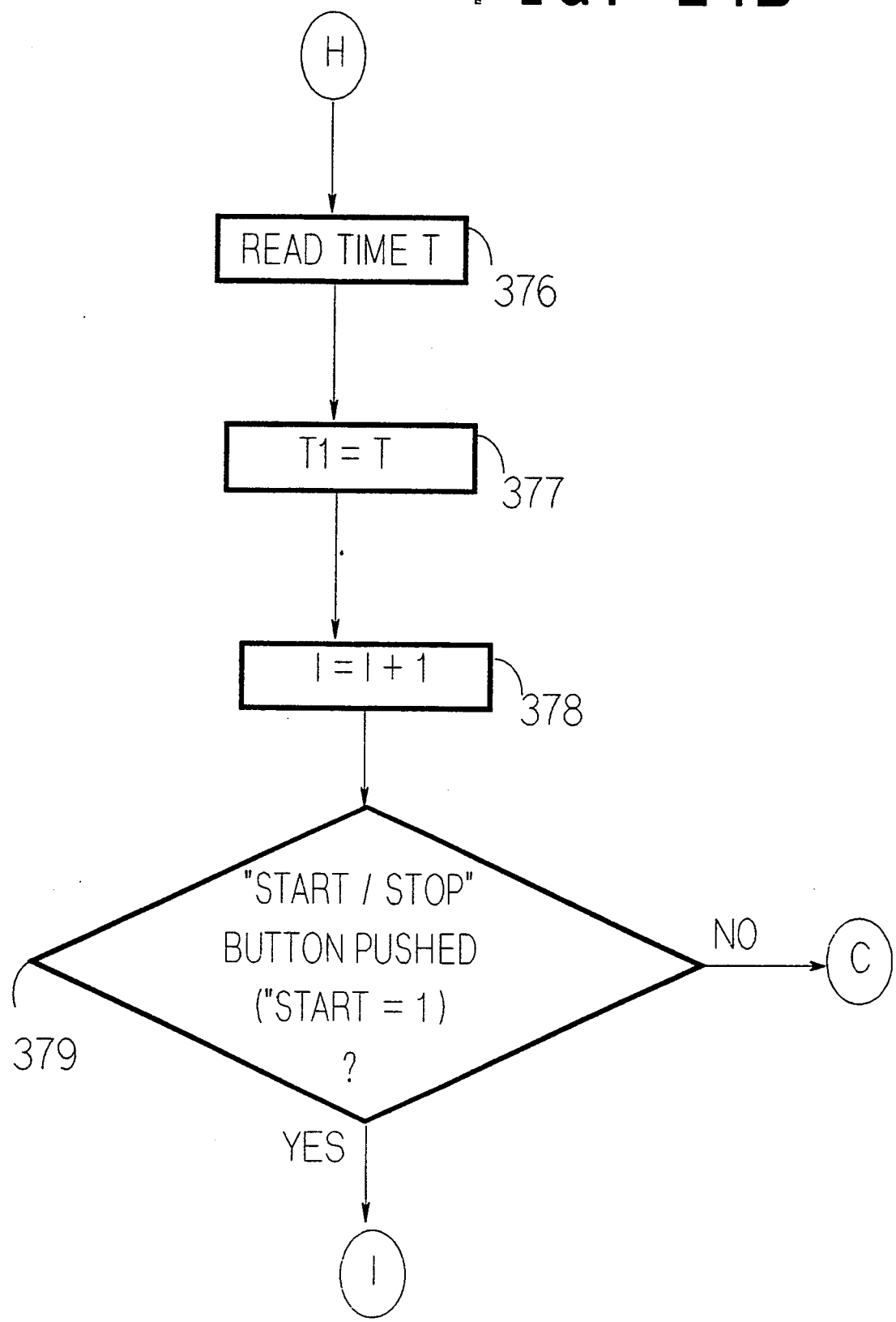
Figure 14C:
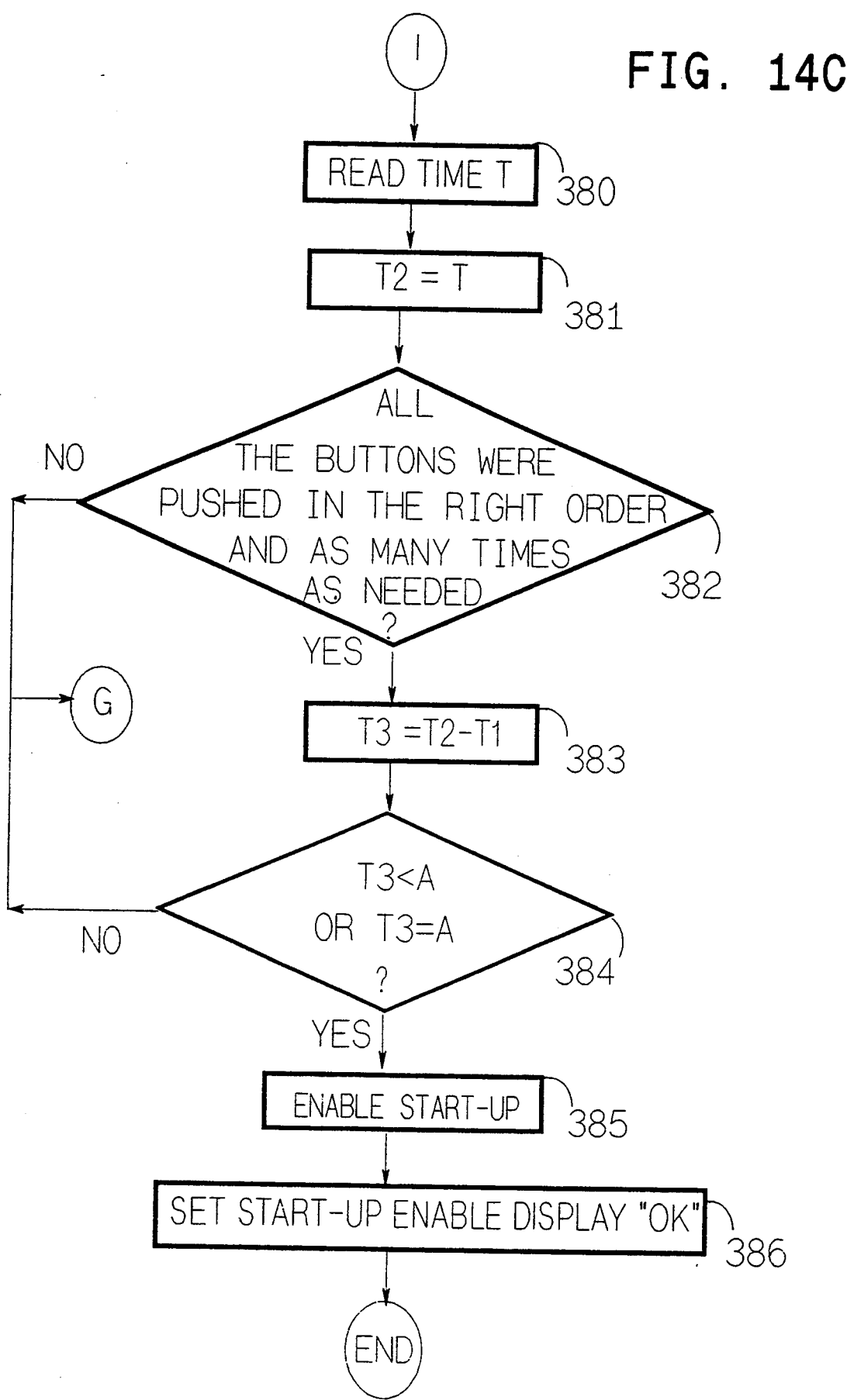
Figure 14D:
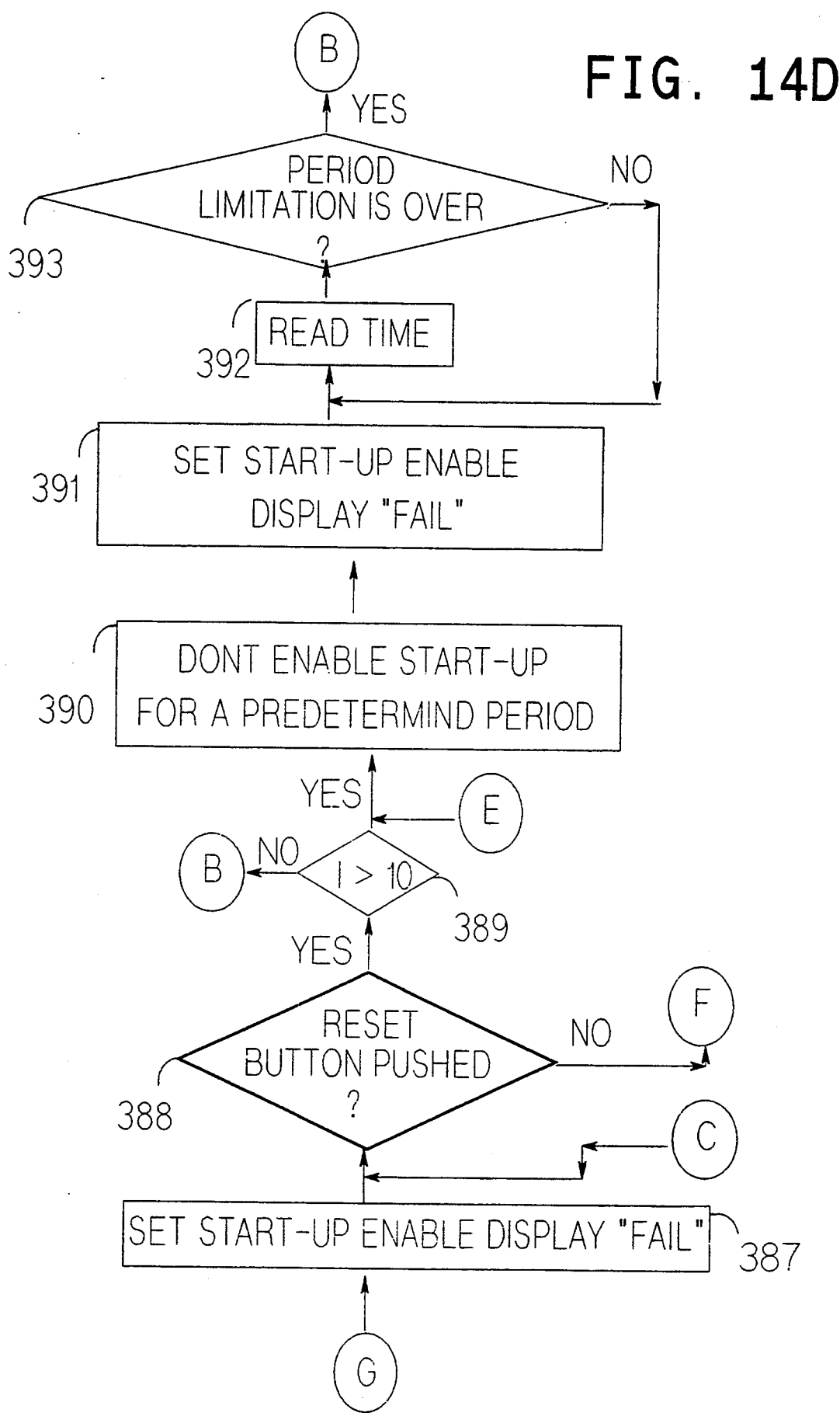

Thus, as shown in FIG. 14a, a counter I, which accumulates the number of attempts by the driver to pass the test, is first initialized (block 370), and then a predetermined number A, representing the maximum permissible time to perform the test, is read (block 371). With respect to the more complicated device illustrated in FIG. 5, the random values in the horizontal display 82, vertical display 83, and first/last (F/L) display 84, are then read into the system (block 373); these set forth the sequences and directions in which keys 81 are to be depressed and the number of times in each sequence they are to be depressed.

The driver then depresses the Start/Stop key 85, and then executes the test depressing the keys 81 according to the random displays 82, 83 and 84, and as soon as this has been completed, the Start/Stop key 85 is again depressed. These operations are indicated by blocks 374–381 in FIG. 14. Following this, a determination is made whether the keys were depressed in the right order and in the correct number of times as displayed (block 382), and within the maximum permissible time allowed (blocks 383, 384). If so, the test was satisfactorily passed, and the operation of the vehicle is enabled (blocks 385 and 386).

On the other hand, if the test was not satisfactorily passed, either because the keys were not properly depressed or the specified time limit was exceeded, the FAIL display 88 is energized. The system permits the operator to make another attempt by depressing the reset key 86 provided the maximum number of attempts had not been exceeded, e.g., ten attempts (blocks 388–393). If the driver failed the test a prescribed number of times, the vehicle is disabled for a prescribed period (e.g., thirty minutes) before the driver can again attempt to pass the test.

Some Variations

Figure 15:
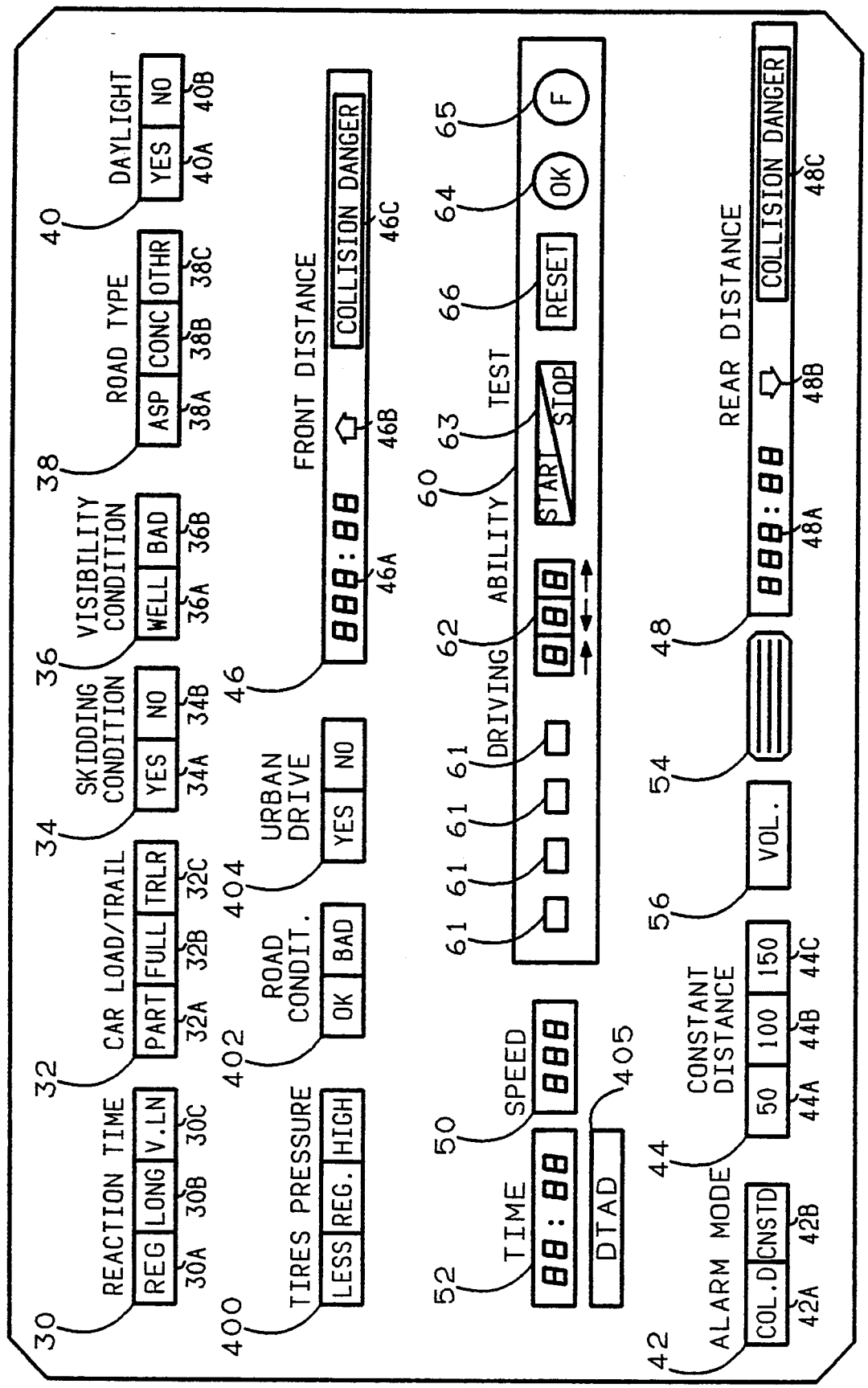
FIG. 15 illustrates another control panel which may be used to include additional presettable parameters.
Figure 16:
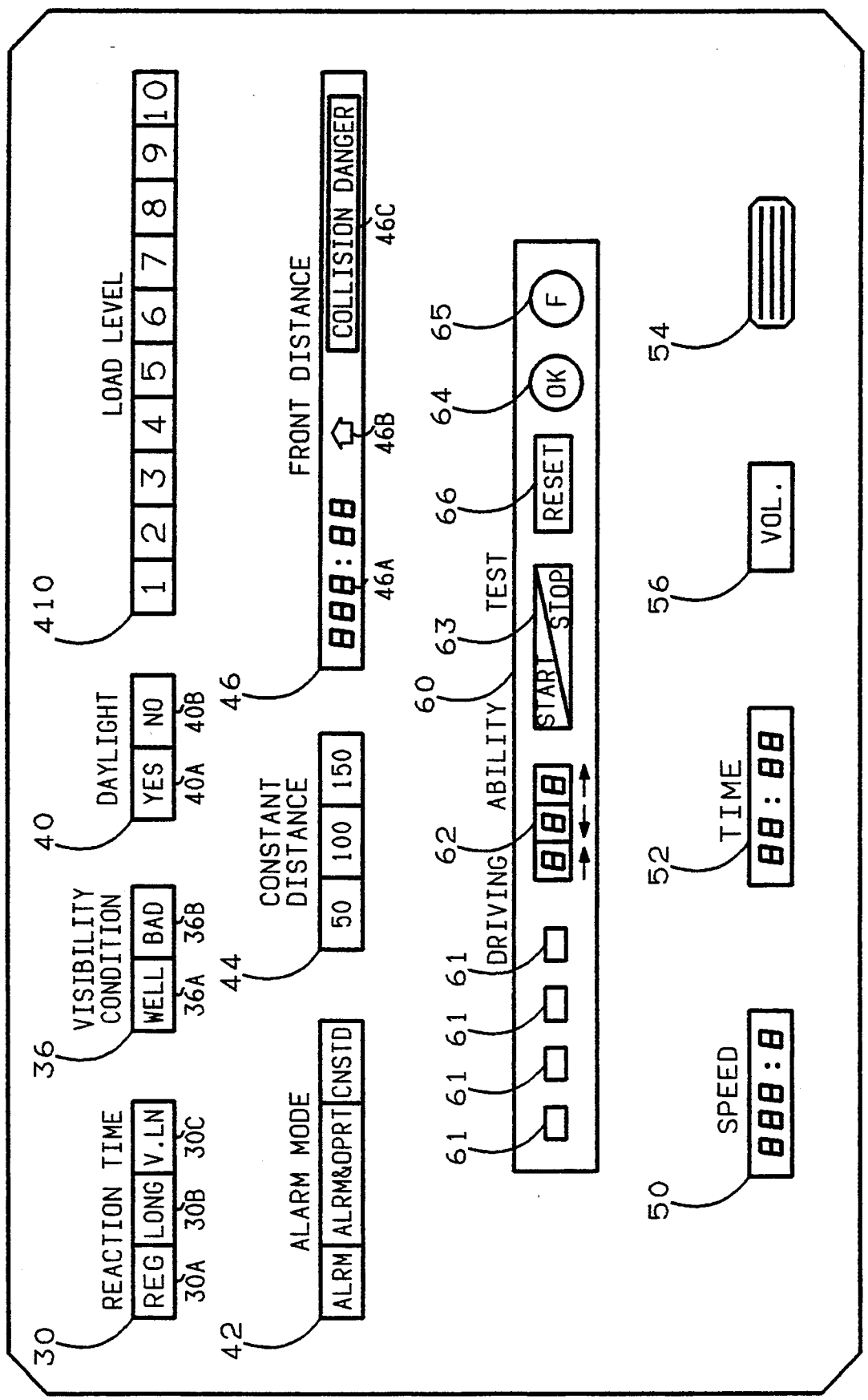
FIG. 16 illustrates a control panel particularly useful with trains.

FIGS. 15 and 16 illustrate two further variations that may be made in the control panel.

FIG. 15 illustrates a control panel which is the same as in FIG. 2, except for the following changes.

One change is that three further parameters may be preset into the system, to be taken into consideration in computing the collision distance and safety distance. Thus, in addition to the other presettable parameters as illustrated in FIG. 2, the control panel shown in FIG. 15 includes an additional group of keys 400 for presetting the tire pressure (which parameter could also be automatically sensed by a sensor), keys 402 for presetting the road condition, and keys 404 for presetting whether the vehicle is being driven in an urban area or on a high speed highway (e.g., a freeway or toll road).

Another change included in the control panel illustrated in FIG. 15 is that it includes a depressible key 405 marked DTAD, standing for Dense Traffic Alarm Disable. Thus, this key may be depressed by the driver when driving in a dense area and, if depressed, would be effective to disable the alarm whenever the distance to another object is less than a predetermined minimum distance, or whenever the speed of the vehicle is less than a predetermined minimum speed, or whenever the product of the above two factors is less than a predetermined minimum value.

The control panel illustrated in FIG. 16 is particularly useful for trains, since it also includes a set of keys 410 indicating many different load levels, e.g., corresponding to the number of cars in the train.

In all other respects, the control panels illustrated in FIGS. 15 and 16 may be substantially the same as described above.

While the invention has been described with respect to several preferred embodiments, it will be appreciated that these are set forth merely for purposes of example, and that the invention, or various aspects of the invention, may be advantageously used with other modifications or in other applications.

What is claimed is:

1. An anti-collision system for moving vehicles, comprising:
   means for determining the speed of a moving vehicle;
   means for measuring the distance of the moving vehicle from an object;
   a computer for receiving a number of parameters, including the speed of the vehicle, and for computing from said parameters a danger-of-collision distance to said object;
   and a collision alarm actuated by said computer when the measured distance of said object is equal to or less than said danger-of-collision distance computed by the computer;
   characterized in that said system also includes a control panel having parameter presetting means for presetting preselected parameters which are utilized by said computer for computing said danger-of-collision distance to said object;
   said preselected parameters including at least one vehicle parameter concerning a preselected condition of the vehicle, and at least one environmental parameter concerning a preselected condition of the environment.

2. The system according to claim 1, wherein the system also includes a safety alarm actuated by said computer, before actuating said collision alarm, when said measured distance is equal to or less than said danger-of-collision distance multiplied by a predetermined safety factor.

3. The system according to claim 2, wherein said control panel also includes distance presetting means for presetting a selected fixed distance from said object, said computer being effective to actuate one of said alarms when the distance to said object is equal to or less than said fixed distance.

4. The system according to claim 1, wherein said preselected parameters further include:
   at least one driver parameter concerning a preselected condition of the vehicle driver.

5. The system according to claim 4, wherein said driver parameter includes a selected one of a plurality of relative reaction times of the vehicle driver.

6. The system according to claim 1, wherein said vehicle parameter includes a selected one of a plurality of relative load conditions of the vehicle.

7. The system according to claim 1, wherein said environmental parameter includes a selected parameter indicative of the danger of the road to skidding.

8. The system according to claim 1, wherein said environmental parameter includes a selected parameter indicative of the visibility condition at the time of driving.

9. The system according to claim 1, wherein said environmental parameter includes a selected parameter indicative of the type of road over which the vehicle is travelling.

10. The system according to claim 1, wherein said environmental parameter includes a selected parameter indicative of whether or not it is daylight at the time of driving.

11. The system according to claims 1, wherein said presetting means includes a plurality of depressible keys on said control panel.

12. The system according to claim 1, wherein said vehicle includes a brake light indicator which is automatically actuated when said collision alarm is actuated.

13. The system according to claim 2, wherein said vehicle includes a brake light indicator which is automatically actuated when said safety alarm is actuated.

14. The system according to claim 1, wherein said control panel includes presettable means for disabling said collision alarm when said measure distance, said determined speed, or the product of said measured distance and said determined speed is less than a predetermined minimum.

15. The system according to claim 1, further including a plurality of condition sensors for sensing any one of a plurality of, said selected conditions, and for automatically feeding to said computer information with respect to said sensed conditions, said information also being utilized by the computer for computing said danger-of-collision distance to said object.

16. The system according to claim 15, wherein said condition sensors include a condition-of-driver sensor, comprising:
   a plurality of depressible keys including a start key and further keys;
   means effective upon depressing the start key for displaying a random sequence in which said further keys are to be depressed;
   and means for comparing the actual sequence in which said further keys are depressed with said displayed random sequence to provide a condition-of-driver parameter, which said condition-of-driver parameter is also utilized by the computer for enabling or disabling vehicle operation or for computing said danger-of-collision distance to said object.

17. The system according to claim 1, wherein said system further includes a sealed recording device which records all incidents in which said computer actuated said alarm including the time, speed and relative distance between the vehicle and said object for each incident.

18. The system according to claim 1, wherein said system further includes an actuator for automatically actuating a mechanical system of the vehicle at the time said collision alarm is actuated.

19. An anti-collision system for moving vehicles, comprising:
   means for determining the speed of a moving vehicle;
   means for measuring the distance of the moving vehicle from an object;
   a computer for receiving a number of parameters, including the speed of the vehicle, and for computing from said parameters a danger-of-collision distance to said object;
   and a collision alarm actuated by said computer when the measured distance of said object is equal to or less than said danger-of-collision distance computed by the computer;
   characterized in that said system also includes a control panel having parameter presetting means for presetting preselected parameters which are utilized by said computer for computing said danger-of-collision distance to said object;
   said preselected parameters including at least one vehicle parameter concerning the load carried by the vehicle, and at least one driver parameter concerning a preselected condition of the vehicle driver.

20. An anti-collision system for moving vehicles, comprising:

means for determining the speed of a moving vehicle;

means for measuring the distance of the moving vehicle from an object;

a computer for receiving a number of parameters, including the speed of the vehicle, and for computing from said parameters a danger-of-collision distance to said object;

and a collision alarm actuated by said computer when the measured distance of said object is equal to or less than said danger-of-collision distance computed by the computer;

characterized in that said system also includes a control panel having parameter presetting means for presetting preselected parameters which are utilized by said computer for computing said danger-of-collision distance to said object;

said preselected parameters including at least one driver parameter concerning a preselected condition of the vehicle driver, and at least one environmental parameter concerning a preselected condition of the environment.

* * * * *